(12) United States Patent  
Kenmochi

(10) Patent No.: US 11,984,060 B2
(45) Date of Patent: May 14, 2024

(54) DISPLAY CONTROL DEVICE, DISPLAY DEVICE, DISPLAY CONTROL METHOD

(71) Applicant: Sharp NEC Display Solutions, Ltd., Tokyo (JP)

(72) Inventor: Isamu Kenmochi, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/642,812

(22) PCT Filed: Sep. 17, 2019

(86) PCT No.: PCT/JP2019/036380
§ 371 (c)(1),
(2) Date: Mar. 14, 2022

(87) PCT Pub. No.: WO2021/053716
PCT Pub. Date: Mar. 25, 2021

(65) Prior Publication Data
US 2023/0005413 A1 Jan. 5, 2023

(51) Int. Cl.
*G09G 3/20* (2006.01)
*G06T 3/40* (2006.01)

(52) U.S. Cl.
CPC ............. *G09G 3/2096* (2013.01); *G06T 3/40* (2013.01); *G09G 2340/0407* (2013.01); *G09G 2360/14* (2013.01)

(58) Field of Classification Search
CPC ......... G09G 3/2096; G09G 2340/0407; G09G 2360/14; G06T 3/40; G06T 3/04
See application file for complete search history.

(56) References Cited

U.S. PATENT DOCUMENTS

2002/0167531 A1* 11/2002 Baudisch .............. G06F 3/1446
345/611
2006/0227969 A1* 10/2006 Johnson .................... G06T 1/00
380/210
(Continued)

FOREIGN PATENT DOCUMENTS

CN 102098521 A 6/2011
CN 102215373 A 10/2011
(Continued)

OTHER PUBLICATIONS

International Search Report (ISR) (PCT Form PCT/ISA/210), in PCT/JP2019/036380, dated Dec. 17, 2019.
(Continued)

*Primary Examiner* — Roy P Rabindranath
(74) *Attorney, Agent, or Firm* — MCGINN I.P. LAW GROUP, PLLC

(57) ABSTRACT

A display control device includes: a photodetection sensor configured to detect light from pixels of display screens with both a first display device and a second display device with a pixel size different from that of the first display device in a display system in which a video signal is displayed on a plurality of display devices adjacent to each other as detection targets; and a display adjustor configured to determine a degree of enlargement or reduction of video signals displayed on the display devices on the basis of a difference between the pixel size of the first display device and the pixel size of the second display device based on a result of detection from the photodetection sensor.

13 Claims, 16 Drawing Sheets

(56) References Cited

U.S. PATENT DOCUMENTS

2007/0285342 A1    12/2007  Morikawa et al.
2016/0155410 A1*  6/2016  Nam .................... G06F 3/1438
                                                                715/745

FOREIGN PATENT DOCUMENTS

| EP | 1 256 873 A2 | 11/2002 |
|---|---|---|
| JP | 2003-050655 A | 2/2003 |
| JP | 2006-524356 A | 10/2006 |
| JP | 2007-264141 A | 10/2007 |
| JP | 2009-210775 A | 9/2009 |
| JP | 2016-047338 A | 4/2016 |
| KR | 10-2015-0107571 A | 9/2015 |

OTHER PUBLICATIONS

Chinese Office Action dated Sep. 27, 2023, in corresponding Chinese Patent Application No. 201980100330.9, with an English translation thereof.

* cited by examiner

FIG. 1

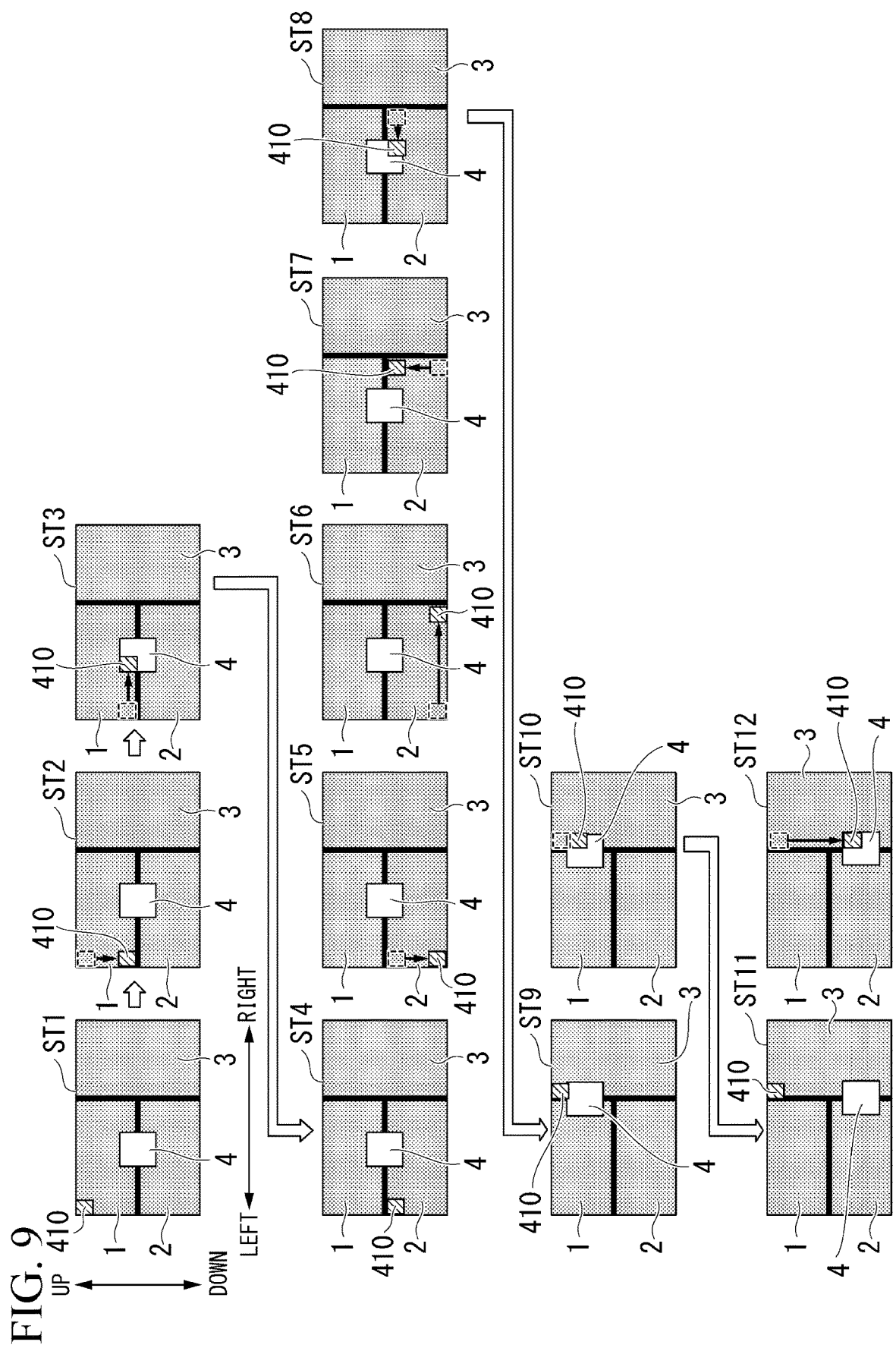

DISPLAY CONTROL DEVICE, DISPLAY DEVICE, DISPLAY CONTROL METHOD

TECHNICAL FIELD

The present invention relates to a display control device, a display device, and a display control method.

BACKGROUND ART

A plurality of display devices may be arranged to construct a multi-display system and one image may be displayed using the plurality of display devices. In such a multi-display system, generally, a plurality of display devices in which one pixel on a display screen is the same size (hereinafter referred to as a "pixel size") are combined.

Patent Literature 1 discloses a game machine in which common image data is displayed on a plurality of display devices with different resolutions. In general, a combination determined according to a predetermined standard is used as a resolution of display. On the other hand, when image data is displayed using a plurality of display devices, only a specific combination of sizes of display screens (sizes of display panels) of display devices which are used is often employed to minimize production costs. Accordingly, a difference in pixel size between display devices occurs due to a difference in size between display panels even with the same resolution.

However, it is not always possible to combine display devices with the same pixel size depending on a width, a height, or the like of an installation place. When display devices with different pixel sizes are combined to construct a multi-display system, there is a problem in that a difference in size between images displayed on the display devices may occur and an image different from an original image as a whole may be displayed.

CITATION LIST

Patent Literature

[Patent Literature 1]
Japanese Unexamined Patent Application, First Publication No. 2016-047338

SUMMARY OF INVENTION

Technical Problem

A problem to be solved is that, when a plurality of display devices with different pixel sizes are combined to display a video signal, continuity of an image indicated by the video signal displayed on neighboring display devices is hindered and an appearance thereof is different from that of an original image.

Solution to Problem

One aspect of the present invention is a display control device including: a photodetection sensor configured to detect light from pixels of display screens with both a first display device and a second display device with a pixel size different from that of the first display device in a display system in which a video signal is displayed on a plurality of display devices adjacent to each other as detection targets; and a display adjustor configured to determine a degree of enlargement or reduction of video signals displayed on the display devices on the basis of a difference between the pixel size of the first display device and the pixel size of the second display device based on a result of detection from the photodetection sensor.

In addition, one aspect of the present invention is a display control method including: causing a photodetection sensor to detect light from pixels of display screens with both a first display device and a second display device with a pixel size different from that of the first display device in a display system in which a video signal is displayed on a plurality of display devices adjacent to each other as detection targets; and causing a display adjustor to determine a degree of enlargement or reduction of video signals displayed on the display devices on the basis of a difference between the pixel size of the first display device and the pixel size of the second display device based on a result of detection from the photodetection sensor.

Advantageous Effects of Invention

According to the present invention, when a plurality of display devices with different pixel sizes are combined to display a video signal, it is possible to decrease a difference in size between images displayed on the display devices and to display an image close to an original image.

BRIEF DESCRIPTION OF DRAWINGS

FIG. 1 is a block diagram schematically illustrating a configuration of a display system to which a display control device according to a first embodiment is applied.

FIG. 9 is a first diagram illustrating an installation position of the photodetection sensor and a detection display pattern according to the first embodiment.

DESCRIPTION OF EMBODIMENTS

Figure 2:
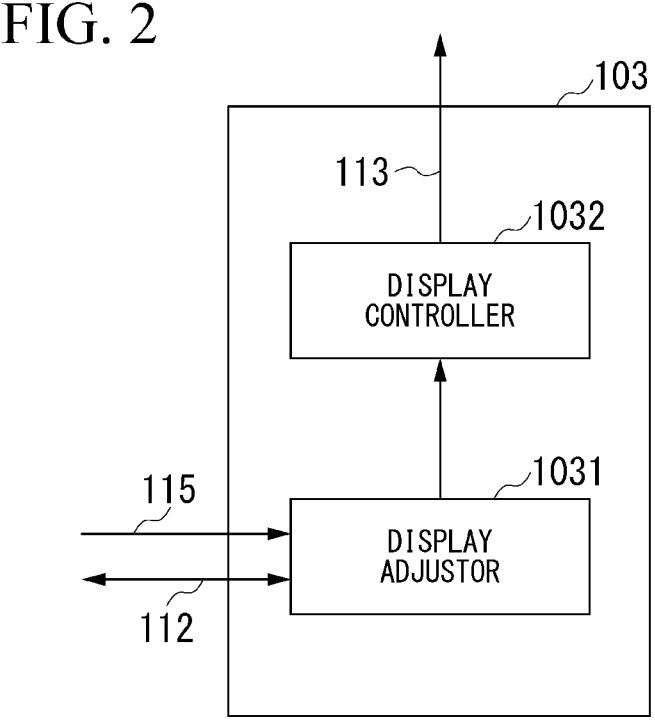
FIG. 2 is a block diagram schematically illustrating a functional configuration of a CPU provided in a display device serving as a master device in the first embodiment.

Hereinafter, embodiments of the present invention will be described.

First Embodiment

Figure 1:
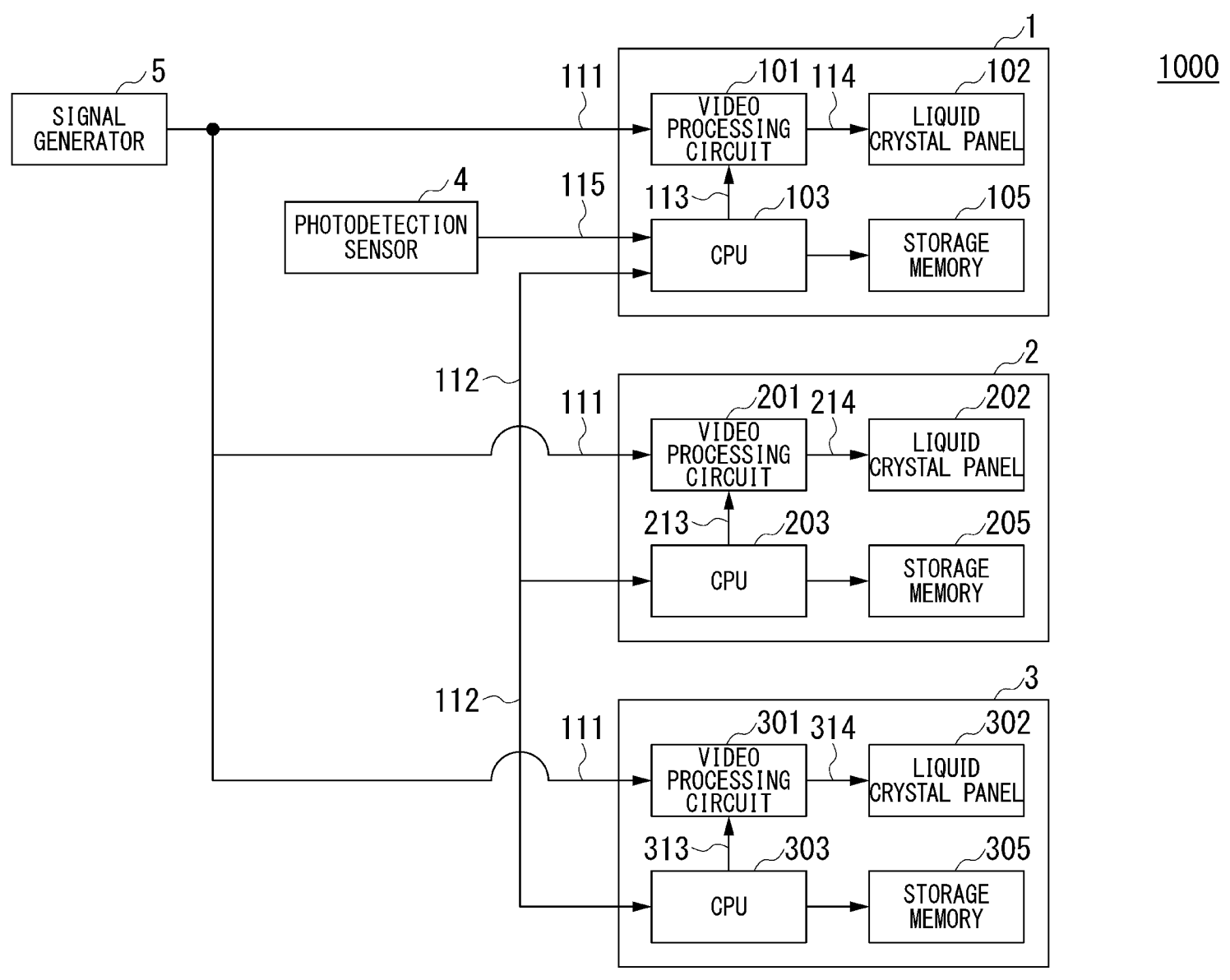

FIG. 1 is a block diagram schematically illustrating a configuration of a display system to which a display control device according to a first embodiment is applied. In this embodiment, a display system 1000 is a display system in which a plurality of display devices are arranged adjacent to each other and one video signal is displayed using display screens of the plurality of display devices and is, for example, a multi-display system.

In the drawing, the display system 1000 includes a display device 1, a display device 2, a display device 3, a photodetection sensor 4, and a signal generator 5.

The signal generator 5 is a computer, a video reproduction device, or the like and outputs data serving as content to the display device 1, the display device 2, and the display device 3 as video signals 111. The video signals 111 output to the display device 1, the display device 2, and the display device 3 are the same. The video signals 111 output to the display device 1, the display device 2, and the display device 3 may be connected like beads as long as they are the same.

The photodetection sensor 4 uses as a detection target both a first display device and a second display device with a pixel size different from that of the first display device out of the display device 1, the display device 2, and the display device 3 in the display system 1000 and detects light from pixels of the display screens thereof. The photodetection sensor 4 includes a first photodetector and a second photodetector of which the first display device is a detection target and a third photodetector and a fourth photodetector of which the second display device is a detection target. The photodetection sensor 4 supplies a result of detection of light as a photodetection-sensor detection signal 115 to a CPU 103 of the display device 1.

The display device 1, the display device 2, and the display device 3 are adjacent to each other in one direction of a longitudinal direction and a lateral direction of the display screens thereof and can display one video signal using the three display screens. In this embodiment, an example in which the display system 100 includes three display devices will be described, but the display system may be configured by arranging N×M display devices adjacent to each other such that N (where N is a natural number equal to or greater than 2) display devices are arranged in a vertical direction (for example, the lateral direction) and M (where M is a natural number equal to or greater than 2) display devices are arranged in a horizontal direction (for example, the longitudinal direction).

The display device 1 is a video display device serving as a master device. The display device 1 has a function of a display control device that controls display of the other display devices 2 and 3. The display device 1 includes a video processing circuit 101, a liquid crystal panel 102, a central processing unit (CPU) 103, and a storage memory 105.

The video processing circuit 101 receives a video signal 111 supplied from the signal generator 5. The video processing circuit 101 processes the input video signal 111 under the control of the CPU 103 and outputs the processed video signal as a liquid-crystal-panel video signal 114 to the liquid crystal panel 102. Examples of the processing include enlargement, reduction, and rotation of the video signal 111. The liquid-crystal-panel video signal 114 is a control signal for displaying the video signal 111 on the liquid crystal panel 102. The video processing circuit 101 has a function of a liquid crystal driving circuit, can drive the liquid crystal panel 102 in accordance with the liquid-crystal-panel video signal 114, and thus can display an image based on the liquid-crystal-panel video signal 114 on the liquid crystal panel 102.

The liquid crystal panel 102 displays an image corresponding to the video signal 111 by driving elements of pixels in accordance with the liquid-crystal-panel video signal 114 output from the video processing circuit 101.

The CPU 103 is a central processing unit. The CPU 103 receives a photodetection-sensor detection signal 115 supplied from the photodetection sensor 4.

The CPU 103 controls the video processing circuit 101 by outputting a video-processing-circuit control signal 113 to the video processing circuit 101. The video-processing-circuit control signal 113 is a control signal for controlling the video processing circuit 101.

The CPU 103 controls the CPU 203 or the CPU 303 by outputting an inter-video-display-device control signal 112 to the CPU 203 or the CPU 303. The inter-video-display-device control signal 112 is a control signal for controlling the other display device 2 or 3.

The storage memory 105 has a function of storing various types of data in accordance with an instruction from the CPU 103 and a function of reading and supplying the stored data to the CPU 103 in accordance with an instruction from the CPU 103.

For example, a volatile memory or a nonvolatile memory can be used as the storage memory 105, and more particularly, a hard disk drive (HDD), a static RAM (SRAM), or the like can be used.

The display device 2 and the display device 3 are video display devices serving as slave devices. The display device 2 and the display device 3 basically have the same configuration as the display device 1. Different configurations will be described below and description of the same configuration will be omitted.

In the display device 2 (display device 3), the video processing circuit 201 (video processing circuit 301) processes an input video signal 111 under the control of the CPU 203 (CPU 303) and outputs the processed video signal as a liquid-crystal-panel video signal 214 (liquid-crystal-panel video signal 314) to the liquid crystal panel 202 (liquid crystal panel 302). The liquid-crystal-panel video signal 214 (liquid-crystal-panel video signal 314) is a control signal for displaying the video signal 111 on the liquid crystal panel 202 (liquid crystal panel 302).

The CPU 203 (CPU 303) which is a central processing unit receives an inter-video-display-device control signal 112 output from the CPU 103 and outputs a video-processing-circuit control signal 213 (video-processing-circuit control signal 313) to the video processing circuit 201 (video processing circuit 301) on the basis of the inter-video-display-device control signal 112. The video-processing-circuit control signal 213 (video-processing-circuit control signal 313) is a control signal for controlling the video processing circuit 201 (video processing circuit 301). The CPU 203 (CPU 303) can perform various types of processes such as displaying of a detection display pattern which will be described later on the basis of the inter-video-display-device control signal 112 in accordance with an instruction from the CPU 103.

The CPU 103, the CPU 203, and the CPU 303 may be configured as dedicated electronic circuits. The CPU 103, the CPU 203, and the CPU 303 may include an A/D converter and a D/A converter. For example, when an electrical signal acquired from the photodetection sensor 4 is an analog signal, the CPU 103, the CPU 203, and the CPU 303 may convert the analog signal to a digital signal using the A/D converter and process the acquired digital signal.

FIG. 2 is a block diagram schematically illustrating a functional configuration of a CPU provided in a display device serving as a master device in the first embodiment.

The CPU 103 includes functions of a display adjustor 1031 and a display controller 1032.

The display adjustor 1031 determines a degree of magnification of a video signal displayed on the display device 1, the display device 2, and the display device 3 on the basis of a difference between a pixel size of the first display device and a pixel size of a second display device of which the pixel size is different from that of the first display device based on a result of detection from the photodetection sensor 4. The degree of magnification may be at least one of a degree of enlargement or a degree of reduction of a display size of the video signal. The degree of enlargement or reduction may be a ratio or may be information for identifying one stage out of a plurality of stages. The display adjustor 1031 determines target areas which are areas to be displayed on the display device 1, the display device 2, and the display device 3 out of an image indicated by the video signal and the degrees of enlargement or reduction of the video signal on the basis of a distance of a non-display area between the display screen of the first display device and the display screen of the second display device and relative positions of the display devices in the display system based on the result of detection from the photodetection sensor 4. For example, the display adjustor 1031 detects a difference between the pixel size of the first display device and the pixel size of the second display device on the basis of a result of detection acquired from the photodetection sensor 4 by detecting a detection display image displayed on the display screen of the first display device, a result of detection acquired from the photodetection sensor 4 by detecting the detection display image displayed on the display screen of the second display device, and details of the detection display image. The detection display image is an image of which a display position on the display screen on which the image is displayed differs or an image in which images with different inspection pattern sizes which are sizes for displaying the detection display image on the display screen are sequentially displayed. More specifically, the display adjustor 1031 detects the difference between the pixel size of the first display device and the pixel size of the second display device on the basis of the number of display pixels between the first photodetector and the second photodetector based on a distance between the first photodetector and the second photodetector and results of detection acquired from the first photodetector and the second photodetector by detecting the detection display image and the number of display pixels between the third photodetector and the fourth photodetector based on a distance between the third photodetector and the fourth photodetector and results of detection acquired from the third photodetector and the fourth photodetector by detecting the detection display image. The display adjustor 1031 detects a distance of a non-display area between the display screen of the first display device and the display screen of the second display device on the basis of a distance between the first photodetector and the third photodetector, a distance from the first photodetector to an end of the display screen of the first display device based on the result of detection acquired from the first photodetector by detecting the detection display image, and a distance from the third photodetector to an end of the display screen of the second display device based on the result of detection acquired from the third photodetector by detecting the detection display image, and determines the target areas of the video signal which are areas to be displayed on the display screens of the display device 1, the display device 2, and the display device 3 and the degrees of enlargement or reduction of the video signal on the basis of the detected non-display area.

The display adjustor 1031 controls display on the display device 2 and the display device 3 by outputting an inter-video-display-device control signal 112 indicating the determined target areas of the video signal on the display device 1, the display device 2, and the display device 3 and the determined degrees of enlargement or reduction of the video signal to the CPU 203 of the display device 2 and the CPU 303 of the display device 3.

The display controller 1032 controls display on the display device 1 by outputting a video-processing-circuit control signal 113 based on the target area of the video signal on the display device 1 and the degree of enlargement or reduction of the video signal determined by the display adjustor 1031 to the video processing circuit 101.

Figure 3:
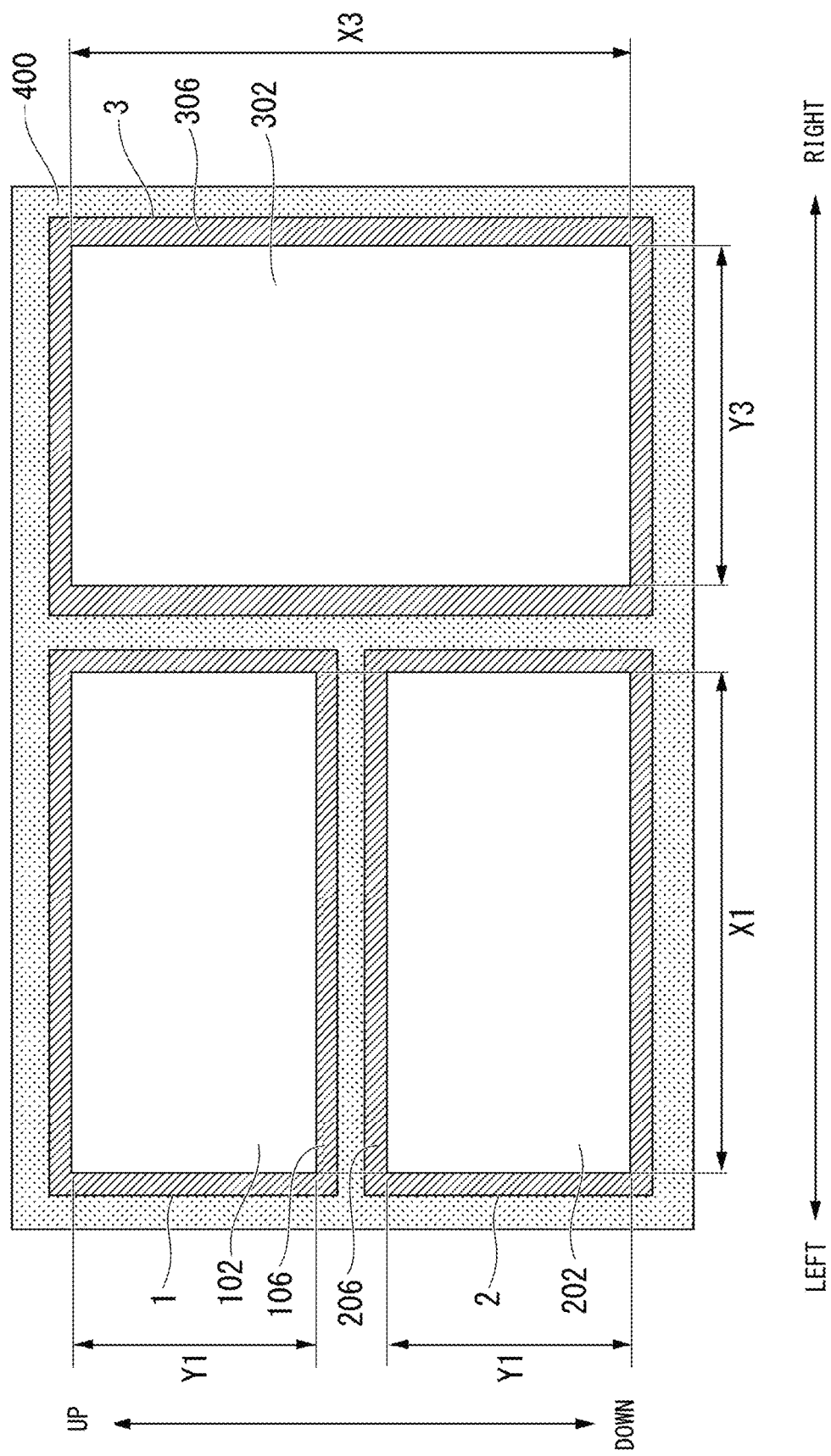
FIG. 3 is a diagram illustrating an example of an arrangement of display devices in the display system according to the first embodiment.

FIG. 3 is a diagram illustrating an example of an arrangement of display devices in the display system according to the first embodiment.

In the following description, it is assumed that the display device 1 and the display device 2 are 40-inch video display devices of 16:9 and the display device 3 is a 46-inch video display device of 16:9. Each of the display device 1 and the display device 2 includes a display screen of which a size is $Y1=49.8$ cm in the vertical direction and $X1=88.6$ cm in the horizontal direction and a size of one pixel is 0.46 mm when the display device includes pixels capable of displaying a resolution of 1920×1080. On the other hand, the display device 3 includes a display screen of which a size is Y3=57.3 cm in the vertical direction and X3=101.8 cm in the horizontal direction and a size of one pixel is 0.53 mm when the display device includes pixels capable of displaying a resolution of 1920×1080. That is, the display device 1, the display device 2, and the display device 3 have the same resolution and different sizes of the display panel and thus have different pixel sizes (that is, different numbers of display pixels per unit area).

Since the length X3=101.8 cm in the horizontal direction of the display screen of the display device 3 is close to a sum 99.6 cm of the length Y1=49.8 cm in the vertical direction of the display screen of the display device 1 and the length Y1=49.8 cm in the vertical direction of the display screen of the display device 2, the display device 1, the display device 2, and the display device 3 are arranged as illustrated in the drawing. Specifically, the display device 2 is arranged adjacent thereto below the display device 1. The display device 3 is arranged adjacent thereto in a 90-degree rotated state on the right of the display device 1 and the display device 2. Accordingly, the display system 1000 has an arrangement in which three display devices 1, 2, and 3 are adjacent to each other and can display one video signal using the three display screens. For example, when one video signal is displayed, the video signal is divided in the direction in which the display device 1, the display device 2, and the display device 3 are arranged, the video signal corresponding to the divided screen on the upper-left side is enlarged or reduced to correspond to the screen size of the display device 1 and is displayed on the display screen of the display device 1, the video signal corresponding to the divided screen on the lower-left side is enlarged or reduced to correspond to the screen size of the display device 2 and is displayed on the display screen of the display device 2, and the video signal corresponding to the divided screen on the right side is enlarged or reduced to correspond to the screen size of the display device 3 and is displayed on the display screen of the display device 3. Accordingly, one video signal can be displayed using the display device 1, the display device 2, and the display device 3.

In the drawing, a background 400 is a view in the back of the display device 1, the display device 2, and the display device 3 when the display device 1, the display device 2, and the display device 3 are installed and the display screens of the display device 1, the display device 2, and the display device 3 are seen. That is, the background 400 is a gap formed between the display device 1, the display device 2, and the display device 3.

A frame portion 106 is provided along an outer circumference of the liquid crystal panel 102 of the display device 1. A frame portion 206 is provided along an outer circumference of the liquid crystal panel 202 of the display device 2. A frame portion 306 is provided along an outer circumference of the liquid crystal panel 302 of the display device 3.

Here, the frame portion 106 and the frame portion 206 are located to face each other in a part in which the display device 1 and the display device 2 face each other. Specifically, a part of the frame portion 106 corresponding to the lower part of the liquid crystal panel 102 and a part of the frame portion 206 corresponding to the upper part of the liquid crystal panel 202 are arranged to face each other. Here, surfaces of the frame portion 106 and the frame portion 206 on the display screen side of the liquid crystal panel 102 (or the liquid crystal panel 202) are located to be interposed between the liquid crystal panel 102 and the liquid crystal panel 202. The frame portion 106 and the frame portion 306 are located to face each other in a part in which the display device 1 and the display device 3 face each other. Specifically, a part of the frame portion 106 corresponding to the right part of the liquid crystal panel 102 and a part of the frame portion 306 corresponding to the left part of the liquid crystal panel 302 are arranged to face each other. Here, surfaces of the frame portion 106 and the frame portion 306 on the display screen side of the liquid crystal panel 102 (or the liquid crystal panel 302) are located to be interposed between the liquid crystal panel 102 and the liquid crystal panel 302. The frame portion 206 and the frame portion 306 are located to face each other in a part in which the display device 2 and the display device 3 face each other. Specifically, a part of the frame portion 206 corresponding to the right part of the liquid crystal panel 202 and a part of the frame portion 306 corresponding to the left part of the liquid crystal panel 302 are arranged to face each other. Here, surfaces of the frame portion 206 and the frame portion 306 on the display screen side of the liquid crystal panel 202 (or the liquid crystal panel 302) are located to be interposed between the liquid crystal panel 202 and the liquid crystal panel 302.

Figure 4A:
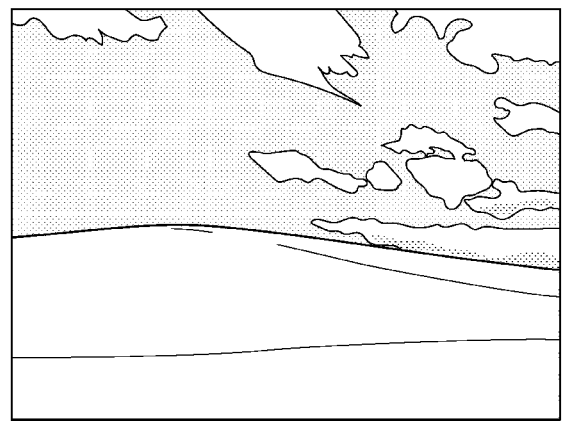
FIG. 4A is a diagram illustrating an example in which a video signal is displayed on three display devices according to the first embodiment.
Figure 4B:
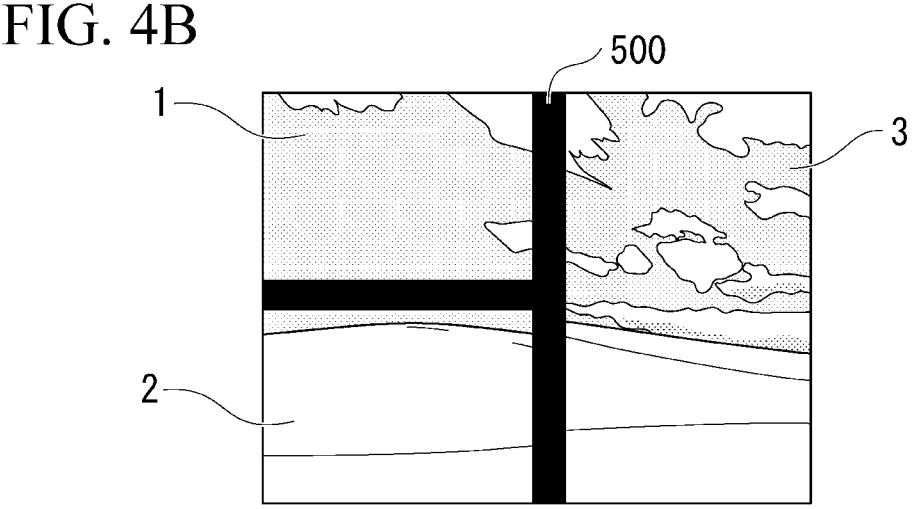
FIG. 4B is a diagram illustrating an example in which a video signal is displayed on three display devices according to the first embodiment.

FIG. 4 is a diagram illustrating an example in which a video signal is displayed on three display devices according to the first embodiment. FIG. 4A is a diagram illustrating a video signal to be displayed. An example in which a ¼ part of the video signal is displayed on each of the display device 1 and the display device 2 and a ½ part of the video signal is displayed on the display device 3 such that the video signal is displayed on three display devices 1, 2, and 3 is illustrated in FIG. 4B. In this case, the frame portions or gaps of the display devices are present as a non-display area 500 between the divided images. The size of the frame portions which is a part of the non-display area 500 is known at the time of production but the gaps cannot be ascertained in advance. Accordingly, a mismatch in display details of the divided screens is generated in the non-display area 500, and discomfort in connection of video signals is caused with the non-display area 500 as a boundary. Since the display device 1, the display device 2, and the display device 3 have different pixel sizes, the sizes of images displayed on the display device 1, the display device 2, and the display device 3 are different.

Figure 4C:
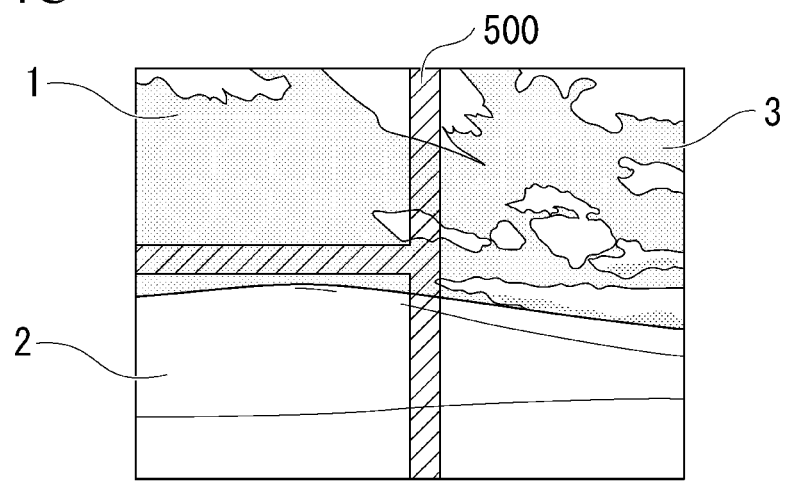
FIG. 4C is a diagram illustrating an example in which a video signal is displayed on three display devices according to the first embodiment.

In this embodiment, by decreasing a size difference or a mismatch in display details on divided screens in consideration of the difference in pixel size and the non-display area 500 between the display device 1, the display device 2, and the display device 3, it is possible to decrease discomfort in connection of video signals with the non-display area 500 as a boundary and to display an ideal state as illustrated in FIG. 4C. Accordingly, the display device 1 serving as a display control device detects a difference in pixel size and a non-display area 500 between the display device 1, the display device 2, and the display device 3 using the photodetection sensor 4.

Figure 5:
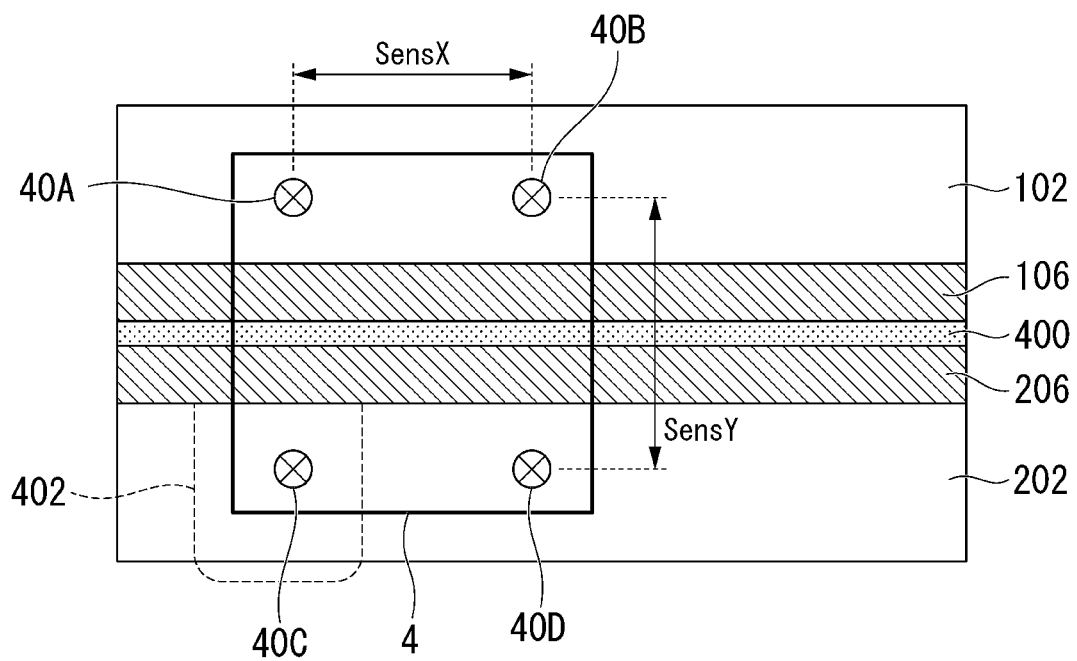
FIG. 5 is a diagram illustrating a relationship between a photodetection sensor and display devices in the first embodiment.

FIG. 5 is a diagram illustrating a relationship between a photodetection sensor and each display device according to the first embodiment. In the drawing, an installation position of the photodetection sensor 4 when the difference in pixel size and the non-display area between the display device 1 and the display device 2 are detected is illustrated.

The photodetection sensor 4 is provided with a plurality of detection areas that can detect light. For example, the photodetection sensor 4 includes four photodetectors including a first photodetector 40A, a second photodetector 40B, a third photodetector 40C, and a fourth photodetector 40D as detection areas that can detect light. In the following description, for the purpose of convenience of description, reference signs A to D will be omitted from the first photodetector 40A, the second photodetector 40B, the third photodetector 40C, and the fourth photodetector 40D regarding common details, and they are simply referred to as a "photodetector 40."

The photodetection sensor 4 is provided to receive light from the liquid crystal panel 102 of the display device 1 and the liquid crystal panel 202 of the display device 2. Here, the photodetection sensor 4 is attached to the display screen side of a junction between the display device 1 and the display device 2 to extend over the liquid crystal panel 102 and the liquid crystal panel 202.

Here, the first photodetector 40A and the second photodetector 40B are located to face the display screen of the liquid crystal panel 102, and the third photodetector 40C and the fourth photodetector 40D are located to face the display screen of the liquid crystal panel 202.

Here, a distance (SensX) between the first photodetector 40A and the second photodetector 40B and a distance between the third photodetector 40C and the fourth photodetector 40D are determined in advance and are known. The distance between the third photodetector 40C and the fourth photodetector 40D may be the same as the distance SensX. A distance between the first photodetector 40A and the third photodetector 40C and a distance (SensY) between the second photodetector 40B and the fourth photodetector 40D are determined in advance and thus are known. The distance between the first photodetector 40A and the third photodetector 40C may be the same as the distance SensY.

A direction in which the first photodetector 40A and the second photodetector 40B are arranged and a direction in which the third photodetector 40C and the fourth photodetector 40D are arranged are parallel or are set to a positional relationship in which they can be considered to be almost parallel.

The first photodetector 40A and the third photodetector 40C are attached to the display device 1 and the display device 2 to be parallel to the facing direction (for example, the vertical direction) of the display device 1 and the display device 2. For example, the first photodetector 40A and the third photodetector 40C are installed in the vertical direction with a non-display area (the frame portion 106, the frame portion 206, and the background 400 (gap) therebetween) between the display screen of the display device 1 and the display screen of the display device 2 interposed therebetween. The second photodetector 40B and the fourth photodetector 40D are attached to the display device 1 and the display device 2 to be parallel to the facing direction (for example, the vertical direction) of the display device 1 and the display device 2.

The first photodetector 40A and the second photodetector 40B detect light from the liquid crystal panel 102. The third photodetector 40C and the fourth photodetector 40D detect light from the liquid crystal panel 202.

The first photodetector 40A, the second photodetector 40B, the third photodetector 40C, and the fourth photodetector 40D can employ detection elements which are physically independent. As the photodetectors 40, detection elements that detect light from a video (a liquid crystal panel) using a plurality of pixels provided in one sensor such as a CCD (a solid-state imaging device) can be used. In this case, specific pixels (pixels at positions corresponding to the first photodetector 40A, the second photodetector 40B, the third photodetector 40C, and the fourth photodetector 40D) out of the plurality of pixels may be used as photodetection parts.

In this case, by setting distances (SensZ) between the video display part (the liquid crystal panel) and the photodetection parts to be known, distances between the photodetection parts are calculated.

The distance SensY is set such that the photodetection sensor 4 includes the frame portion 106, the frame portion 206, a part of the liquid crystal panel 102, and a part of the liquid crystal panel 202. For example, the distance SensX and the distance SensY can be set to about 15 cm. The distance SensX and the distance SensY may be the same or different from each other.

A method of detecting a position of each photodetector 40 will be described below with reference to the vicinity of a part indicated by reference sign 402 in the drawing.

FIG. 6 is a diagram illustrating a relationship between a photodetector and a detection display pattern according to the first embodiment. In the drawing, an example in which the position of the third photodetector 40C is detected is illustrated.

A detection display pattern is a detection display image that is displayed to detect positions of the photodetectors 40 of the photodetection sensor 4. For example, the detection display pattern is a bright image of which light is detected by the corresponding photodetector 40 when the detection display pattern is displayed in a pixel in the detection area of the photodetector 40.

When the detection display pattern is displayed on the liquid crystal panel 102, the display adjustor 1031 of the CPU 103 outputs a video-processing-circuit control signal 113 for displaying the detection display pattern to the video processing circuit 101. For example, the display adjustor 1031 designates a pixel (one or more pixels) on the display screen of the liquid crystal panel 102 on which the detection display pattern is displayed. Accordingly, the video processing circuit 101 displays the designated detection display pattern on the pixel of the liquid crystal panel 102. When the detection display pattern is displayed on the liquid crystal panel 202, the display adjustor 1031 outputs an inter-video-display-device control signal 112 for displaying the detection display pattern to the CPU 203. For example, the display adjustor 1031 designates a pixel (one or more pixels) on the display screen of the liquid crystal panel 202 on which the detection display pattern is displayed. Accordingly, the CPU 203 controls the video processing circuit 201 such that the detection display pattern is displayed on the designated pixel of the liquid crystal panel 202.

When the detection display pattern is displayed in the detection area of the third photodetector 40C, the third photodetector 40C detects light. Accordingly, the display adjustor 1031 displays the detection display pattern of which an inspection pattern size is a predetermined size on the liquid crystal panel 202 while sequentially moving a display position thereof until the third photodetector 40C detects light. Here, the inspection pattern size is a size of an area in which the detection display pattern to be displayed in at least part of the display area of the liquid crystal panel is displayed. Details of the method of moving a position at which the detection display pattern is displayed will be described later.

Figure 6A:
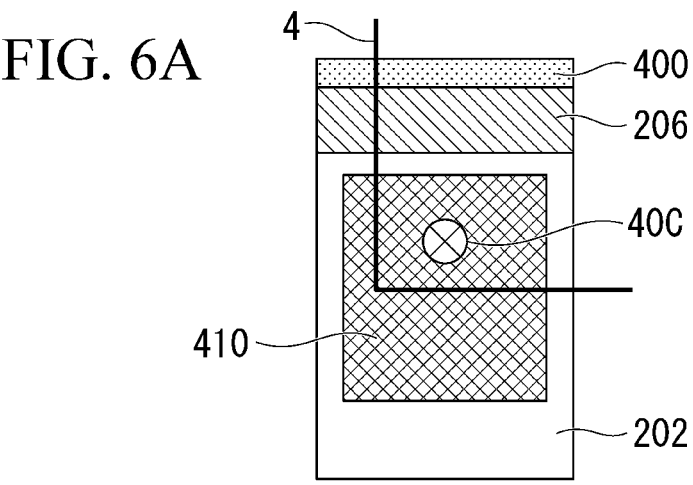
FIG. 6A is a diagram illustrating a relationship between a photodetector and a detection display pattern according to the first embodiment.
Figure 6B:
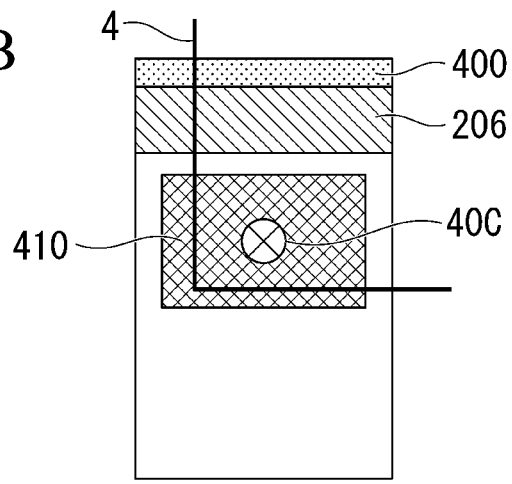
FIG. 6B is a diagram illustrating a relationship between a photodetector and a detection display pattern according to the first embodiment.
Figure 6C:
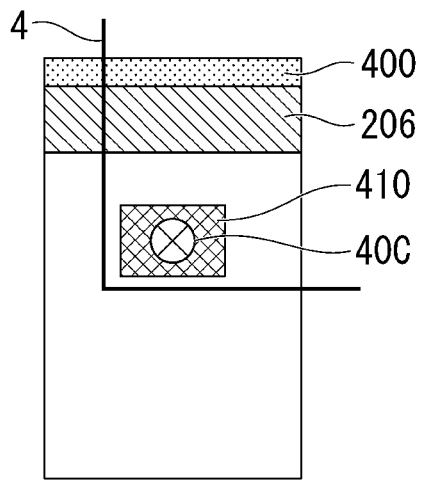
FIG. 6C is a diagram illustrating a relationship between a photodetector and a detection display pattern according to the first embodiment.

In FIG. 6A, since a detection display pattern 410 is displayed in the detection area of the third photodetector 40C on the liquid crystal panel 202, the third photodetector 40C detects light. When the third photodetector 40C detects light, the display adjustor 1031 reduces the inspection pattern size of the detection display pattern 410 as illustrated in FIG. 6B. When the third photodetector 40C detects light in spite of reduction of the inspection pattern size of the detection display pattern 410, the display adjustor 1031 further reduces the inspection pattern size of the detection display pattern 410 as illustrated in FIG. 6C. When the third photodetector 40C does not detect light with the reduction of the inspection pattern size of the detection display pattern 410, the display adjustor 1031 moves the display position of the detection display pattern 410. In this way, the display adjustor 1031 gradually reduces the inspection pattern size of the detection display pattern 410 until it becomes a size determined as a lower limit value.

Subsequent processes in a case in which detectable range of the third photodetector 40C is equal to or less than a size of one display pixel (Case 1) and a case in which the detectable range includes two or more display pixels (Case 2) will be described below.

(Case 1)

When the detectable range of the third photodetector 40C of the photodetection sensor 4 is equal to or less than a size of one pixel, the display adjustor 1031 sets the inspection pattern size of the detection display pattern to about one pixel, moves the display position in the vertical direction or the horizontal direction without changing the size of the detection display pattern, and detects a position of a pixel from which light has been detected by the third photodetector 40C as a position of the third photodetector 40C. Here, the display adjustor 1031 identifies the position of the third photodetector 40C using brightness of a display pixel. For example, when the third photodetector 40C and one pixel on which the detection display pattern is displayed are located to face each other, light is detected by the third photodetector 40C and thus the display adjustor 1031 can detect the position of the pixel as the position of the third photodetector 40C.

(Case 2)

When the detectable range of the third photodetector 40C includes two or more pixels, that is, when the size of the range in which the third photodetector 40C can detect light is a size including a range of two or more neighboring pixels, the display adjustor 1031 performs one of a process (a) and a process (b).

(a) By setting the inspection pattern size of the detection display pattern to about one pixel and moving the detection display pattern in the vertical direction or the horizontal direction, the display adjustor 1031 detects the position of the pixel when the third photodetector 40C has detected light as the position of the third photodetector 40C. Here, the display adjustor 1031 detects a position at which the brightness of light detected by the third photodetector 40C is the highest as the position of the third photodetector 40C.

(b) The display adjustor 1031 sets the size of the inspection pattern size of the detection display pattern to two or more neighboring pixels, performs at least one process of a process of moving the detection display pattern in the vertical direction or the horizontal direction (changing the display position) and a process of changing the inspection pattern size of the detection display pattern, and identifies a position at which the detection display pattern when light has been detected by the third photodetector 40C is displayed using the brightness of the detected light. The display adjustor 1031 can identify the position of the third photodetector 40C by identifying the position of the pixel from which the brightness of the light has been detected. For example, even when there are two or more positions at which the brightness of the light detected by the third photodetector 40C is equal to or higher than predetermined brightness with changing of the position of the detection display pattern, the display adjustor 1031 can detect the position of the third photodetector 40C, for example, by calculating a center position of the pixels.

In Case 2, for example, when the detection display pattern is a detection display pattern for turning on about one pixel and sufficient change of a detected value detected by the third photodetector 40C is acquired by moving the detection display pattern in the vertical direction or the horizontal direction, the display adjustor 1031 uses the result acquired through the process (a). On the other hand, otherwise, the display adjustor 1031 uses the result acquired through the process (b).

The display adjustor 1031 detects positions for the first photodetector 40A, the second photodetector 40B, and the fourth photodetector 40D using the same method. When the positions of the photodetectors 40 of the photodetection sensor 4 are detected, the display adjustor 1031 detects a difference in pixel size and a distance of a non-display area between the display device 1 and the display device 2 in which the photodetection sensor 4 is installed. The display adjustor 1031 can calculate a junction surface of the display device 1 and the display device 2 from the positions of the photodetectors 40 and thus can also calculate the direction of the display device 1 and the display device 2.

Figure 7:
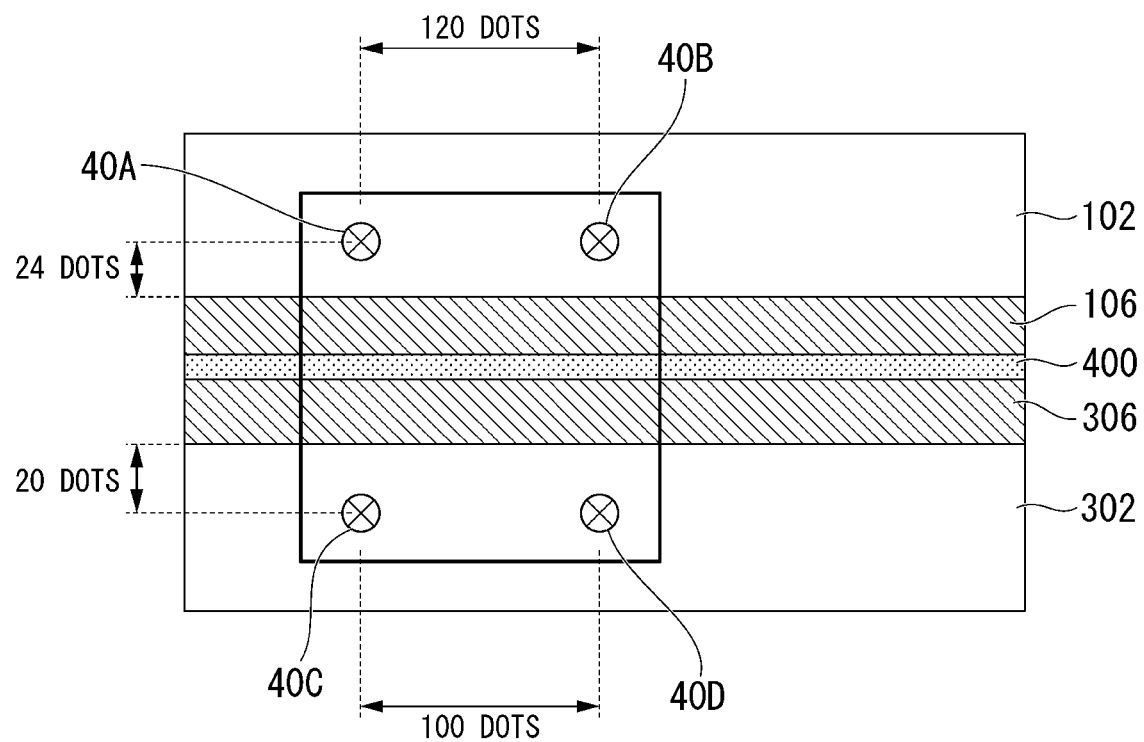
FIG. 7 is a diagram illustrating a difference in pixel size and a non-display area between display devices based on a result of detection from a photodetection sensor according to the first embodiment.

FIG. 7 is a diagram illustrating a difference in pixel size and a non-display area between the display devices based on a result of detection from the photodetection sensor according to the first embodiment. In the drawing, an example in which a non-display area and a difference in pixel size between the display device 1 and the display device 3 using the photodetection sensor 4 are detected is illustrated. In this example, the first photodetector 40A and the second photodetector 40B are installed at positions facing the display screen of the liquid crystal panel 102, and the third photodetector 40C and the fourth photodetector 40D are installed at positions facing the display screen of the liquid crystal panel 302.

Here, an example in which all distances of the distance (SensX) between the first photodetector 40A and the second photodetector 40B, the distance between the third photodetector 40C and the fourth photodetector 40D, the distance between the first photodetector 40A and the third photodetector 40C, and the distance (SensY) between the second photodetector 40B and the fourth photodetector 40D are 10 cm will be specifically described. The display device 1 and the display device 3 are installed to be parallel, the first photodetector 40A and the second photodetector 40B are installed to be parallel to the junction, the third photodetector 40C and the fourth photodetector 40D are installed to be parallel to the junction, and the first photodetector 40A and the third photodetector 40C are installed to be perpendicular to the junction.

As a result of detection of the positions of the photodetectors 40, it is assumed that the number of display pixels between the first photodetector 40A and the second photodetector 40B is 120 dots and the number of display pixels between the third photodetector 40C and the fourth photodetector 40D is 100 dots. Accordingly, the display adjustor 1031 detects that the pixel size of the display device 3 is larger 1.2 times than the pixel size of the display device 1 on the basis of the ratio of the numbers of display pixels. That is, the display adjustor 1031 detects a difference (for example, a ratio of the pixel sizes) between the pixel size of the display device 1 and the pixel size of the display device 3 on the basis of the distance and the number of display pixels between the first photodetector 40A and the second photodetector 40B installed in the display device 1 and the distance and the number of display pixels between the third photodetector 40C and the fourth photodetector 40D installed in the display device 3.

As a result of detection of the positions of the photodetectors 40, it is assumed that the number of display pixels from the first photodetector 40A to an end of the liquid crystal panel 102 on the third photodetector 40C side is 24 dots and the number of display pixels from the third photodetector 40C to an end of the liquid crystal panel 302 on the first photodetector 40A side is 20 dots. Accordingly, the display adjustor 1031 detects that the distance from the first photodetector 40A to the end of the liquid crystal panel 102 corresponds to 2 cm on the basis of the number of display pixels between the first photodetector 40A and the second photodetector 40B which is 120 dots. That is, the display adjustor 1031 calculates the distance from the first photodetector 40A to the end of the liquid crystal panel 102 on the basis of the number of display pixels and the distance between the first photodetector 40A and the second photodetector 40B and the number of display pixels from the first photodetector 40A to the end of the liquid crystal panel 102. The display adjustor 1031 detects that the distance from the third photodetector 40C to the end of the liquid crystal panel 302 corresponds to 2 cm on the basis of the number of display pixels between the third photodetector 40C and the fourth photodetector 40D which is 100 dots. That is, the display adjustor 1031 calculates the distance from the third photodetector 40C to the end of the liquid crystal panel 302 on the basis of the number of display pixels and the distance between the third photodetector 40C and the fourth photodetector 40D and the number of display pixels from the third photodetector 40C to the end of the liquid crystal panel 302. The display adjustor 1031 detects that the distance of the non-display area between the display device 1 and the display device 3 is 6 cm by subtracting the distance between the first photodetector 40A and the end of the liquid crystal panel 102 which is 2 cm and the distance between the third photodetector 40C and the end of the liquid crystal panel 302 which is 2 cm from the distance between the first photodetector 40A and the third photodetector 40C which is 10 cm.

In this way, the display adjustor 1031 detects the non-display area and the difference in pixel size between the display device 1, the display device 2, and the display device 3. The display adjustor 1031 detects a junction surface (a relationship) between the display device 1, the display device 2, and the display device 3 from the positions of the photodetectors 40 and detects the directions of the display device 1, the display device 2, and the display device 3 from the junction surfaces. The display adjustor 1031 determines target areas of a video signal displayed on the display device 1, the display device 2, and the display device 3 and degrees of enlargement or reduction of the video signal on the basis of the non-display areas, the differences in pixel size, the positional relationships, and the directions detected between the display device 1, the display device 2, and the display device 3.

Figure 8A:
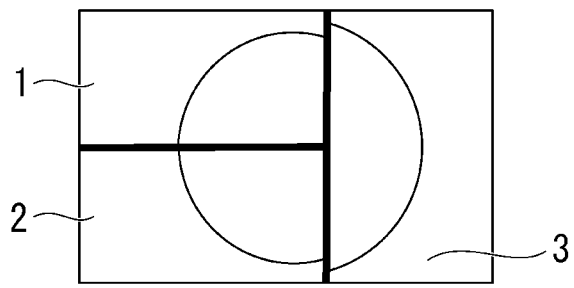
FIG. 8A is a diagram illustrating an example in which a video signal is displayed on the display system according to the first embodiment.

FIG. 8 is a diagram illustrating an example in which a video signal is displayed in the display system according to the first embodiment. FIG. 8A is a diagram illustrating an example in which a video signal is divided and displayed without considering a pixel size and a non-display area. When a video signal representing a circle is simply divided in a quarter and displayed on the display device 1 and the display device 2 and is divided in a half and displayed on the display device 3 such that the video signal is displayed on three display devices, the pixel size of the display device 3 is larger than those of the display device 1 and the display device 2 and thus a display size thereof is larger.

Figure 8B:
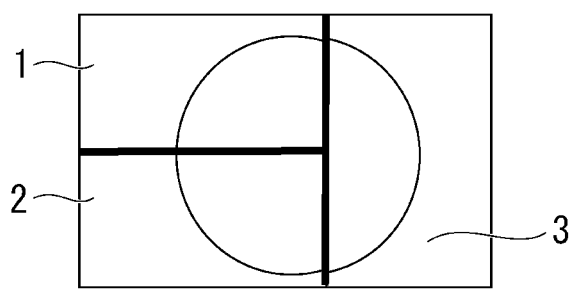
FIG. 8B is a diagram illustrating an example in which a video signal is displayed on the display system according to the first embodiment.

FIG. 8B is a diagram illustrating an example in which a video signal is divided and displayed in consideration of a pixel size. The display adjustor 1031 reduces a display size of the display device 3 to 0.89 times or enlarges a display size of the display device 1 and the display device 2 to 1.15 times on the basis of the difference in the pixels size between the display device 1, the display device 2, and the display device 3. Since reduction causes a margin, enlargement is preferable. Accordingly, the display adjustor 1031 enlarges the display size of the display device 1 and the display device 2 to 1.15 times according to the largest pixel size of the display device 3. Accordingly, the difference in pixel size between the display device 1, the display device 2, and the display device 3 is decreased. However, in the example illustrated in the drawing, since a non-display area is not considered, discomfort in connection of the video signal with the non-display area as a boundary is caused.

Figure 8C:
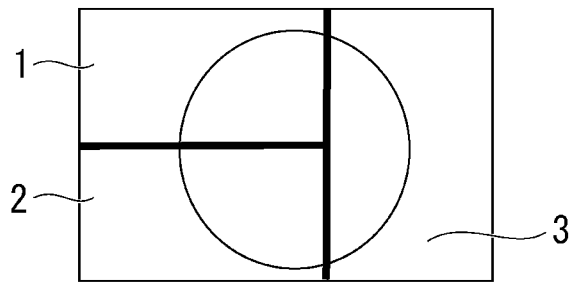
FIG. 8C is a diagram illustrating an example in which a video signal is displayed on the display system according to the first embodiment.

FIG. 8C is a diagram illustrating an example in which a video signal is divided and displayed in consideration of a pixel size and a non-display area. The display adjustor 1031 determines display areas (ranges of divided areas) which are target areas of the video signal displayed on the display device 1, the display device 2, and the display device 3 using the distance of the non-display areas between the display device 1, the display device 2, and the display device 3, enlarges or reduces video signals (the target areas) divided on the basis of the display areas, and displays the enlarged or reduced video signals on the display device 1, the display device 2, and the display device 3. Accordingly, as illustrated in the drawing, a true circle close to the original video signal is displayed in the display system 1000. In this way, with the display system 1000, it is possible to decrease mismatch in display details on the screen divided into the display device 1, the display device 2, and the display device 3 and to decrease discomfort in connection of video signals with the non-display areas as boundaries.

A method of moving an installation position of the photodetection sensor 4 and a position at which the detection display pattern is displayed will be described below in detail. Since the installation position of the photodetection sensor 4 is an arbitrary position on a display screen, the installation position needs to be calculated on the basis of the detection display pattern and the result of detection from the photodetection sensor 4. In consideration of rotational installation of a display screen, the photodetection sensor 4 needs to be installed for every two joining display screens of the display device 1, the display device 2, and the display device 3 and the positions of the photodetectors 40 need to be detected. First, a method of moving a detection display pattern along an edge of a display screen and stopping the detection display pattern at a position at which light is detected by the photodetection sensor 4 (a first moving method) will be described.

FIG. 9 is a first diagram illustrating an installation position of a photodetection sensor and a detection display pattern according to the first embodiment. First, a photodetection sensor 4 is installed in the display device 1 and the display device 2 to detect the non-display area and the difference in pixel size between the display device 1 and the display device 2 such that it extends over the non-display area between the display device 1 and the display device 2. The first photodetector 40A and the second photodetector 40B of the photodetection sensor 4 are installed in the display device 1, and the third photodetector 40C and the fourth photodetector 40D are installed in the display device 2.

In the drawing, states in which a detection display pattern 410 with a predetermined inspection pattern size is moved on a display screen are illustrated. The display adjustor 1031 searches for a detection area (an installation position) of the photodetection sensor 4 on the display screen by moving the detection display pattern 410 of which light is detected by the photodetection sensor 4 when it is displayed in the detection area of the photodetection sensor 4 along an edge of the display screen.

Specifically, first, the display adjustor 1031 displays the detection display pattern 410 in the upper-left part of the display screen of the display device 1 (State ST1). Subsequently, the display adjustor 1031 sequentially moves the detection display pattern 410 from the upper-left part to the lower-left part along the left edge of the display screen of the display device 1 (State ST2). Subsequently, the display adjustor 1031 sequentially moves the detection display pattern 410 from the upper-left part to the lower-right part along the lower edge of the display screen of the display device 1 (State ST3). Then, when light is detected by the photodetection sensor 4, the display adjustor 1031 detects the positions of the first photodetector 40A and the second photodetector 40B by gradually decreasing the inspection pattern size of the detection display pattern 410 as described above.

When the positions of the first photodetector 40A and the second photodetector 40B are detected, the display adjustor 1031 displays the detection display pattern 410 in the upper-left part of the display screen of the display device 2 (State ST4). Subsequently, the display adjustor 1031 sequentially moves the detection display pattern 410 from the upper-left part to the lower-left part along the left edge of the display screen of the display device 2 (State ST5). Subsequently, the display adjustor 1031 sequentially moves the detection display pattern 410 from the upper-left part to the lower-right part along the lower edge of the display screen of the display device 2 (State ST6). Subsequently, the display adjustor 1031 sequentially moves the detection display pattern 410 from the lower-right part to the upper-right part along the right edge of the display screen of the display device 2 (State ST7). Subsequently, the display adjustor 1031 sequentially moves the detection display pattern 410 from the upper-right part to the upper-left part along the upper edge of the display screen of the display device 2 (State ST8). Then, when light is detected by the photodetection sensor 4, the display adjustor 1031 detects the positions of the third photodetector 40C and the fourth photodetector 40D by gradually decreasing the inspection pattern size of the detection display pattern 410 as described above.

Subsequently, the photodetection sensor 4 is installed in the display device 1 and the display device 3 to detect a non-display area and a difference in pixel size between the display device 1 and the display device 3 with the non-display area between the display device 1 and the display device 3 interposed therebetween. The first photodetector 40A and the second photodetector 40B of the photodetection sensor 4 are installed in the display device 1, and the third photodetector 40C and the fourth photodetector 40D are installed in the display device 3.

First, the display adjustor 1031 displays the detection display pattern 410 in the upper-left part of the display screen of the display device 3 (State ST9). Subsequently, the display adjustor 1031 sequentially moves the detection display pattern 410 from the upper-left part to the lower-left part along the left edge of the display screen of the display device 1 (State ST10). Then, when light is detected by the photodetection sensor 4, the display adjustor 1031 detects the positions of the third photodetector 40C and the fourth photodetector 40D by gradually decreasing the inspection pattern size of the detection display pattern 410 as described above. The display adjustor 1031 detects the positions of the first photodetector 40A and the second photodetector 40B installed in the display device 1 in the same way.

Subsequently, the photodetection sensor 4 is installed in the display device 2 and the display device 3 to detect a non-display area and a difference in pixel size between the display device 2 and the display device 3 with the non-display area between the display device 2 and the display device 3 interposed therebetween. The first photodetector 40A and the second photodetector 40B of the photodetection sensor 4 are installed in the display device 2, and the third photodetector 40C and the third-fourth photodetector 40D are installed in the display device 3.

First, the display adjustor 1031 displays the detection display pattern 410 in the upper-left part of the display screen of the display device 3 (State ST11). Subsequently, the display adjustor 1031 sequentially moves the detection display pattern 410 from the upper-left part to the lower-left part along the left edge of the display screen of the display device 3 (State ST12). Then, when light is detected by the photodetection sensor 4, the display adjustor 1031 detects the positions of the third photodetector 40C and the fourth photodetector 40D by gradually decreasing the inspection pattern size of the detection display pattern 410 as described above. The display adjustor 1031 detects the positions of the first photodetector 40A and the second photodetector 40B installed in the display device 2 in the same way.

A method of displaying a detection display pattern with a small thickness along an edge of a display screen and moving the reduced detection display pattern along the edge from which light is detected by the photodetection sensor 4 (a second moving method) will be described.

Figure 10:
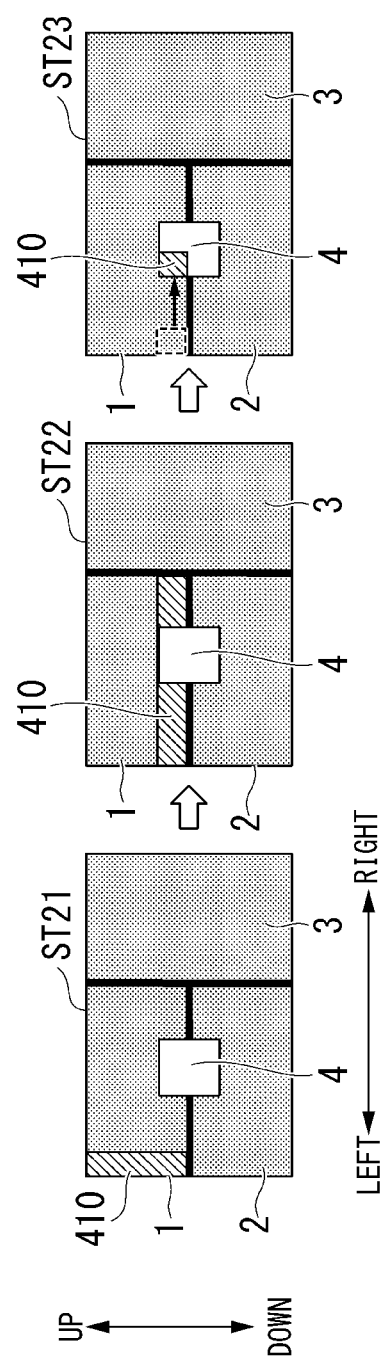
FIG. 10 is a second diagram illustrating an installation position of the photodetection sensor and a detection display pattern according to the first embodiment.

FIG. 10 is a second diagram illustrating an installation position of a photodetection sensor and a detection display pattern according to the first embodiment. In the drawing, an example in which the position of the photodetection sensor 4 in the display device 1 is detected is illustrated. The photodetection sensor 4 is installed in the display device 1 and the display device 2 to detect the non-display area and the difference in pixel size between the display device 1 and the display device 2 with the non-display area between the display device 1 and the display device 2 interposed therebetween. The first photodetector 40A and the second photodetector 40B of the photodetection sensor 4 are installed in the display device 1, and the third photodetector 40C and the fourth photodetector 40D are installed in the display device 2.

In the drawing, states in which a detection display pattern 410 with an inspection pattern size is displayed on a display screen are illustrated. The display adjustor 1031 searches for a detection area (an installation position) of the photodetection sensor 4 on the display screen by displaying the detection display pattern 410 of which light is detected by the photodetection sensor 4 when it is displayed in the detection area of the photodetection sensor 4 along an edge of the display screen and moving the reduced detection display pattern 410 along the edge in which light is detected by the photodetection sensor 4.

Specifically, first, the display adjustor 1031 displays the detection display pattern 410 with a predetermined width along the whole left edge of the display screen of the display device 1 (State ST21). Subsequently, when light is not detected by the photodetection sensor 4, the display adjustor 1031 displays the detection display pattern 410 with a predetermined height along the whole lower edge of the display screen of the display device 1 (State ST22). Then, when light is detected from the lower edge by the photodetection sensor 4, the display adjustor 1031 sequentially moves the detection display pattern 410 with a predetermined reduced inspection pattern size from the lower-left part to the lower-right part along the lower edge of the display screen of the display device 1 (State ST23). When light is detected by the photodetection sensor 4, the display adjustor 1031 detects the positions of the first photodetector 40A and the second photodetector 40B by gradually decreasing the inspection pattern size of the detection display pattern 410 as described above.

A method of searching for a part from which light is detected by the photodetection sensor 4 while changing an area obtained by dividing the display screen (a third moving method) will be described below.

Figure 11:
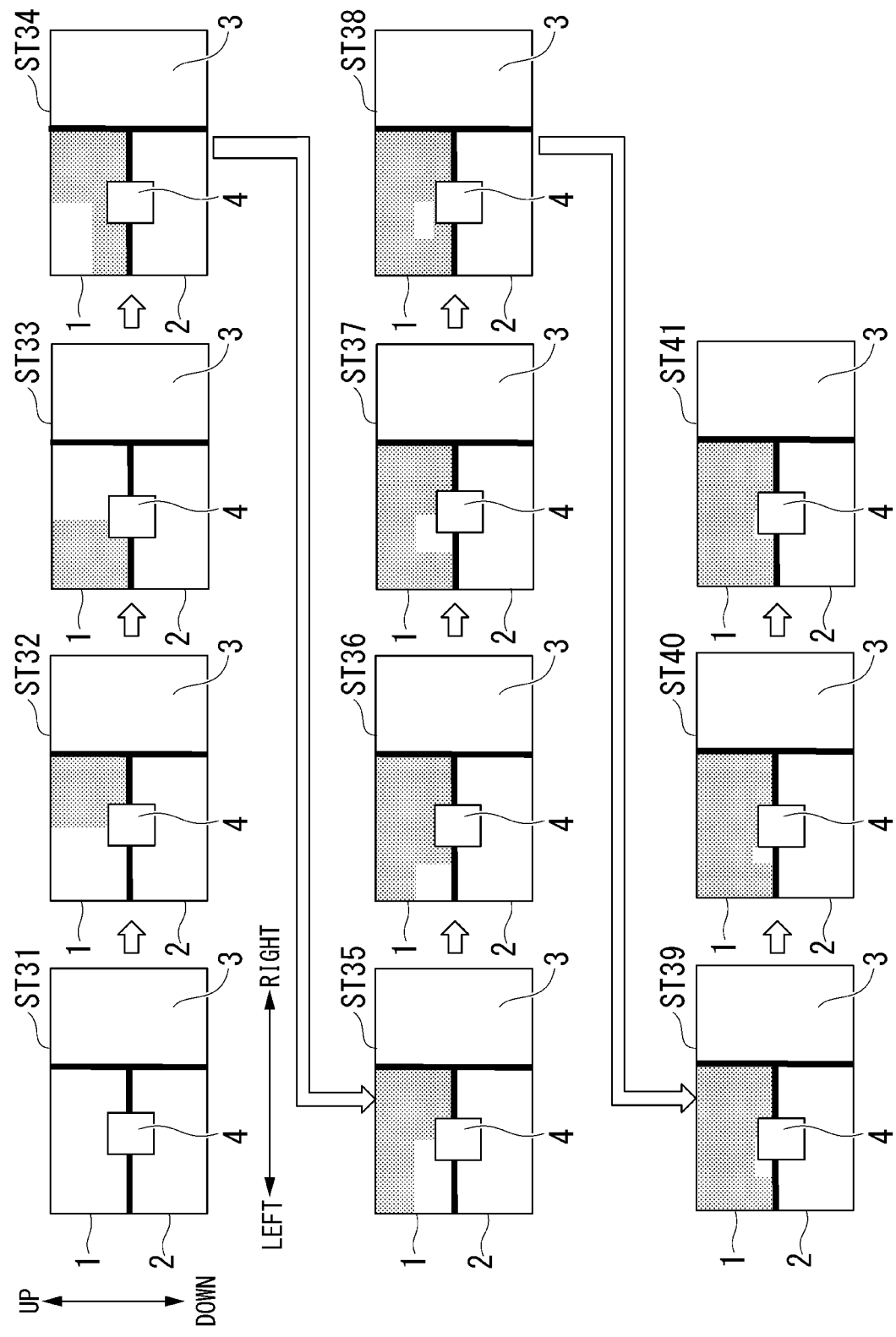
FIG. 11 is a third diagram illustrating an installation position of the photodetection sensor and a detection display pattern according to the first embodiment.

FIG. 11 is a third diagram illustrating an installation position of a photodetection sensor and a detection display pattern according to the first embodiment. In the drawing, an example in which the position of the photodetection sensor 4 in the display device 1 is detected is illustrated. The photodetection sensor 4 is installed in the display device 1 and the display device 2 to detect the non-display area and the difference in pixel size between the display device 1 and the display device 2 with the non-display area between the display device 1 and the display device 2 interposed therebetween. The first photodetector 40A and the second photodetector 40B of the photodetection sensor 4 are installed in the display device 1, and the third photodetector 40C and the fourth photodetector 40D are installed in the display device 2.

In the drawing, states in which a white part on a display screen is a detection display pattern 410 are illustrated. The display adjustor 1031 searches for a detection area (an installation position) of the photodetection sensor 4 on the display screen by displaying the detection display pattern of which light is detected by the photodetection sensor 4 when it is displayed in the detection area of the photodetection sensor 4 in a divided area while dividing the display screen.

First, the display adjustor 1031 displays the detection display pattern on the whole display screen of the display device 1 and detects that the photodetection sensor 4 is installed in the display device 1 (State ST31). Subsequently, the display adjustor 1031 divides the display screen of the display device 1 into two screens in the horizontal direction and displays the detection display pattern on the whole left divided screen (State ST32). Subsequently, the display adjustor 1031 displays the detection display pattern on the whole right divided screen (State ST33). The display adjustor 1031 estimates that the photodetection sensor 4 is located on the left part of the display screen on the basis of a result of detection from the photodetection sensor 4. Accordingly, the display adjustor 1031 additionally divides the left screen of the two divided screens into two screens in the vertical direction and displays the detection display pattern on the whole upper divided screen (State ST34). Subsequently, the display adjustor 1031 displays the detection display pattern on the whole divided lower screen (State ST35). The display adjustor 1031 estimates the photodetection sensor 4 is located in the lower-left part of the display screen on the basis of a result of detection from the photodetection sensor 4. Accordingly, the display adjustor 1031 additionally divides the lower-left screen of the four divided screens into two screens in the horizontal direction and displays the detection display pattern on the whole left divided screen (State ST36). Subsequently, the display adjustor 1031 displays the detection display pattern on the whole right divided screen (State ST37). The display adjustor 1031 estimates that the photodetection sensor 4 is located in the lower-left center on the basis of a result of detection from the photodetection sensor 4. Accordingly, the display adjustor 1031 additionally divides the eight divided screens into two screens in the vertical direction and displays the detection display pattern on the whole upper divided screen (State ST38). Subsequently, the display adjustor 1031 displays the detection display pattern on the whole lower divided screen (State ST39). Then, the display adjustor 1031 estimates that the photodetection sensor 4 is located on the lower divided screen on the basis of a result of detection from the photodetection sensor 4. Accordingly, the display adjustor 1031 additionally divides the 16 divided screens into two screens in the horizontal direction and displays the detection display pattern on the whole left divided screen (State ST40). Subsequently, the display adjustor 1031 displays the detection display pattern on the whole right divided screen (State ST41). In this way, by repeatedly dividing the detection display pattern, the display adjustor 1031 detects the positions of the first photodetector 40A and the second photodetector 40B.

The display adjustor 1031 may search for the detection area (the installation position) of the photodetection sensor 4 by combination of two or three of the first to third moving methods described above.

Figure 12:
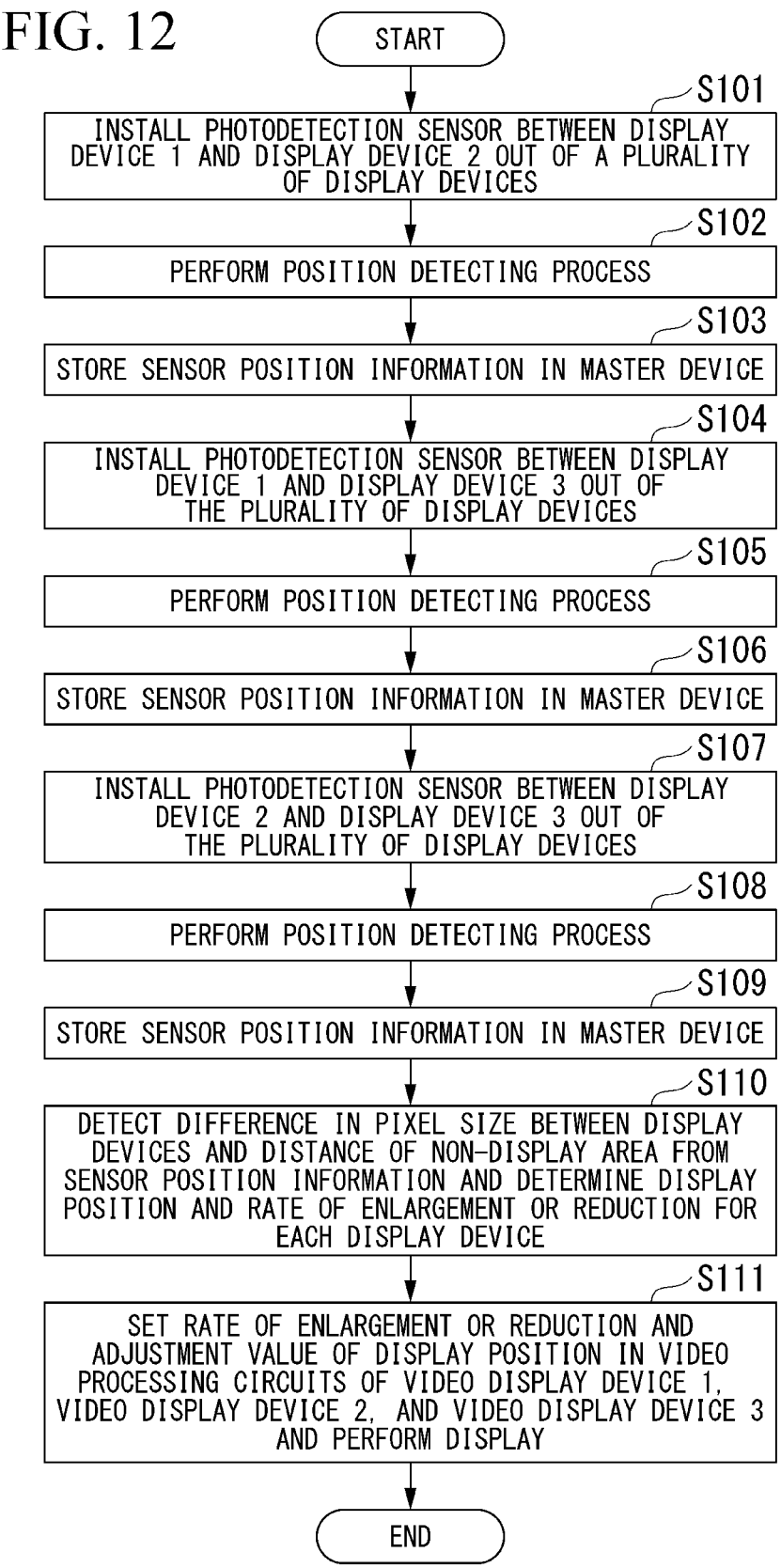
FIG. 12 is a flowchart illustrating a routine of a display control process of controlling display in the display system according to the first embodiment.

FIG. 12 is a flowchart illustrating a routine of a display control process of controlling display in the display system according to the first embodiment.

First, the photodetection sensor 4 is installed to extend over a space between the display device 1 and the display device 2 out of the display device 1, the display device 2, and the display device 3 (Step S101). Then, the display adjustor 1031 performs a position detecting process of detecting a position on the basis of a result of detection from the photodetection sensor 4 (Step S102). The position detecting process will be described later. The positions of the first photodetector 40A and the second photodetectors 40B on the liquid crystal panel 102 of the display device 1 and the positions of the third photodetector 40C and the fourth photodetector 40D on the liquid crystal panel 202 of the display device 2 are detected through this position detecting process. The display adjustor 1031 writes and stores sensor position information indicating the detected positions in the storage memory 105 in the display device 1 (Step S103).

Then, the photodetection sensor 4 is installed to extend over a space between the display device 1 and the display device 3 (Step S104). Then, the display adjustor 1031 performs a position detecting process of detecting a position on the basis of a result of detection from the photodetection sensor 4 (Step S105). The positions of the first photodetector 40A and the second photodetectors 40B on the liquid crystal panel 102 of the display device 1 and the positions of the third photodetector 40C and the fourth photodetector 40D on the liquid crystal panel 302 of the display device 3 are detected through this position detecting process. The display adjustor 1031 writes and stores sensor position information indicating the detected positions in the storage memory 105 in the display device 1 (Step S106).

Then, the photodetection sensor 4 is installed to extend over a space between the display device 2 and the display device 3 (Step S107). Then, the display adjustor 1031 performs a position detecting process of detecting a position on the basis of a result of detection from the photodetection sensor 4 (Step S108). The positions of the first photodetector 40A and the second photodetectors 40B on the liquid crystal panel 202 of the display device 2 and the positions of the third photodetector 40C and the fourth photodetector 40D on the liquid crystal panel 302 of the display device 3 are detected through this position detecting process. The display adjustor 1031 writes and stores sensor position information indicating the detected positions in the storage memory 105 in the display device 1 (Step S109).

Then, the display adjustor 1031 detects the difference in pixel size and the distance of the non-display area between the display device 1, the display device 2, and the display device 3 on the basis of the sensor position information stored in the storage memory 105 and determines a target area of the video signal on each of the display device 1, the display device 2, and the display device 3 and a rate of enlargement or a rate of reduction of the video signal (Step S110). For example, the display adjustor 1031 determines the rate of enlargement or the rate of reduction of the video signal on each of the display device 1, the display device 2, and the display device 3 according to the larger pixel size. The display adjustor 1031 determines a target area which is a display area of the video signal on each of the display device 1, the display device 2, and the display device 3 and the rate of enlargement or the rate of reduction of the video signal using the shortest distance of the non-display area. Accordingly, the display adjustor 1031 divides the video signal to correspond to three screens and allocates the divided screens to the corresponding ones of the display device 1, the display device 2, and the display device 3.

Subsequently, the display adjustor 1031 outputs an adjustment value indicating the display area of the video signal on each of the display device 1, the display device 2, and the display device 3 and the rate of enlargement or the rate of reduction to the video processing circuit 101 of the display device 1, the video processing circuit 201 of the display device 2, and the video processing circuit 301 of the display device 3. The video processing circuit 101, the video processing circuit 201, and the video processing circuit 301 having received such information enlarge or reduce the allocated divided screen of the video signal on the basis of the rate of enlargement or the rate of reduction and the adjustment value of the display area, determine an area to be displayed of the divided screen according to the adjustment value of the display area, and display an image on the liquid crystal panel 102, the liquid crystal panel 202, and the liquid crystal panel 302 (Step S111). Thereafter, the routine ends. Accordingly, the display system 1000 displays one video signal using three display devices including the display device 1, the display device 2, and the display device 3.

Figure 13:
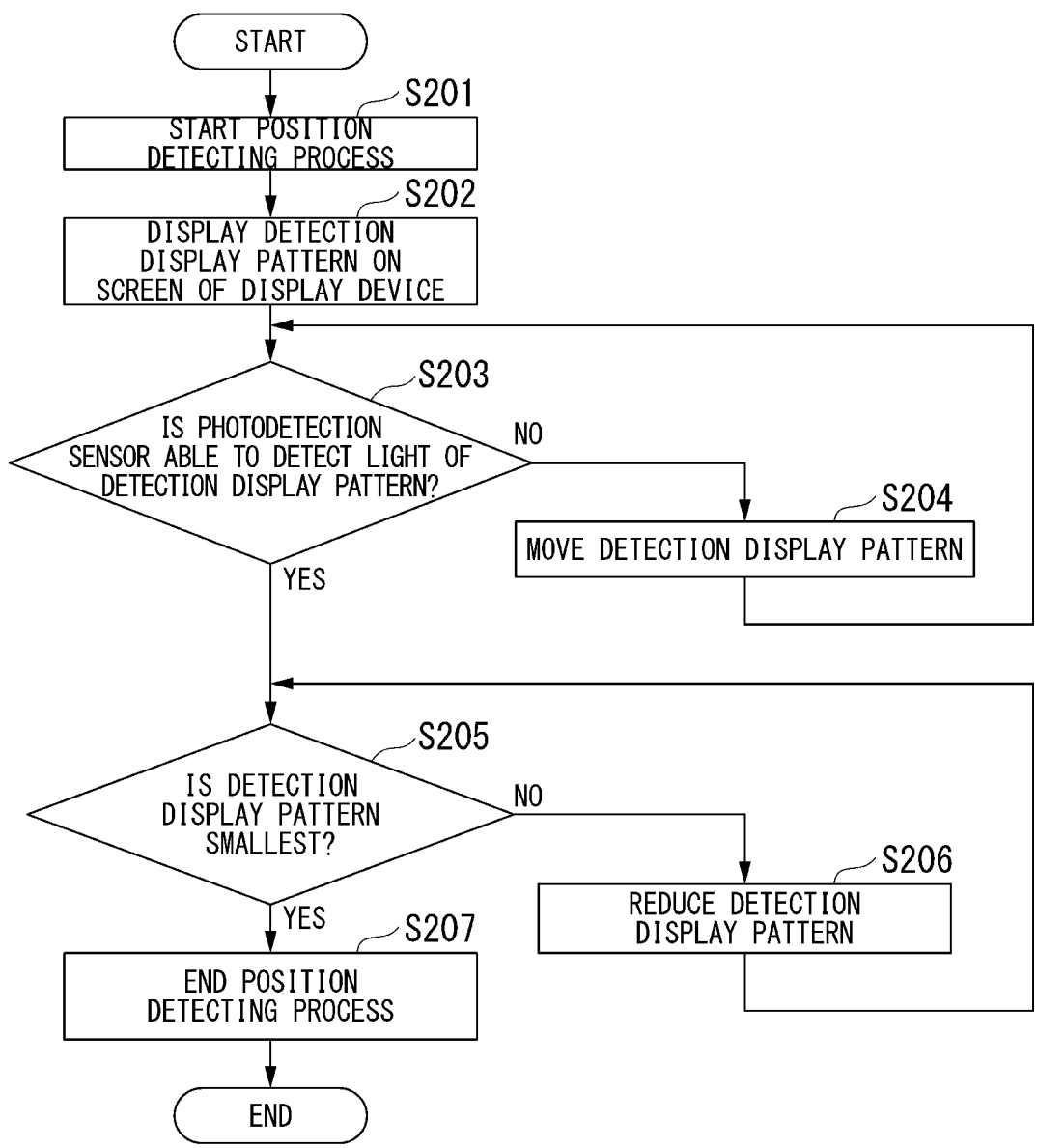
FIG. 13 is a flowchart illustrating a routine of a position detecting process which is performed by a display device serving as a master device according to the first embodiment.

FIG. 13 is a flowchart illustrating a routine of a position detecting process which is performed by a display device serving as a master device according to the first embodiment.

First, when the position detecting process for the photodetection sensor 4 is started (Step S201), the display adjustor 1031 instructs the display device 1, the display device 2, or the display device 3, which the photodetection sensor 4 is attached to and which is controlled, to display a detection display pattern. The display device 1, the display device 2, or the display device 3 having been instructed displays the detection display pattern on the display screen thereof (Step S202).

The display adjustor 1031 acquires a result of detection from the photodetection sensor 4 at that time and determines whether light of the detection display pattern has been detected by the photodetection sensor 4 (Step S203). When light has not been detected, the display adjustor 1031 instructs the display device 1, the display device 2, or the display device 3 under the control to move the detection display pattern on the display screen (Step S204). For example, the display adjustor 1031 moves the detection display pattern using one of the first to third moving methods or a combination thereof. Accordingly, the position at which the detection display pattern is displayed on the display screen of the display device 1, the display device 2, or the display device 3 under the control is changed and then the routine proceeds to Step S203.

When it is determined in Step S203 that light has been detected by the photodetection sensor 4, the display adjustor 1031 determines whether the inspection pattern size of the detection display pattern is a predetermined size (for example, a minimum size) (Step S205). When the inspection pattern size of the detection display pattern is not the predetermined size, the display adjustor 1031 instructs the display device 1, the display device 2, or the display device 3 under the control to further reduce the inspection pattern size of the detection display pattern (Step S206). Accordingly, the inspection pattern size of the detection display pattern is reduced on the screen of the display device 1, the display device 2, or the display device 3 under the control and then the routine proceeds to Step S205.

On the other hand, when the inspection pattern size of the detection display pattern is the predetermined size, the display adjustor 1031 completes the position detecting process by detecting the positions of the photodetectors 40 on the basis of the position at which the detection display pattern is displayed (Step S207) and ends the routine.

As described above, according to this embodiment, the display device 1 which is an example of the display control device includes the photodetection sensor 4 configured to detect light from pixels of display screens using both a first display device and a second display device with a pixel size different from that of the first display device in a display system in which a video signal is displayed on a plurality of display devices adjacent to each other as detection targets and the display adjustor 1031 configured to determine a degree of enlargement or reduction of video signals displayed on the display devices on the basis of a difference between the pixel size of the first display device and the pixel size of the second display device based on a result of detection from the photodetection sensor 4.

With this configuration, since a video signal can be displayed on the display devices in consideration of a difference in pixel size between a plurality of display devices, it is possible to curb a decrease in continuity of an image indicated by a video signal which is displayed on display devices adjacent to each other and to display an image with maintained continuity close to an original image even when display devices with different pixel sizes are combined.

The display adjustor 1031 determines a target area of a video signal displayed on each display device and a rate of enlargement or a rate of reduction of the video signal on the basis of a distance of a non-display area between the display screen of the first display device and the display screen of the second display device based on a result of detection from the photodetection sensor 4. With this configuration, since a video signal can be displayed on the display devices in consideration of a non-display area between a plurality of display devices, it is possible to decrease discomfort in connection of a video signal with respect to the non-display area as a boundary.

Second Embodiment

A second embodiment will be described below.

Figure 14:
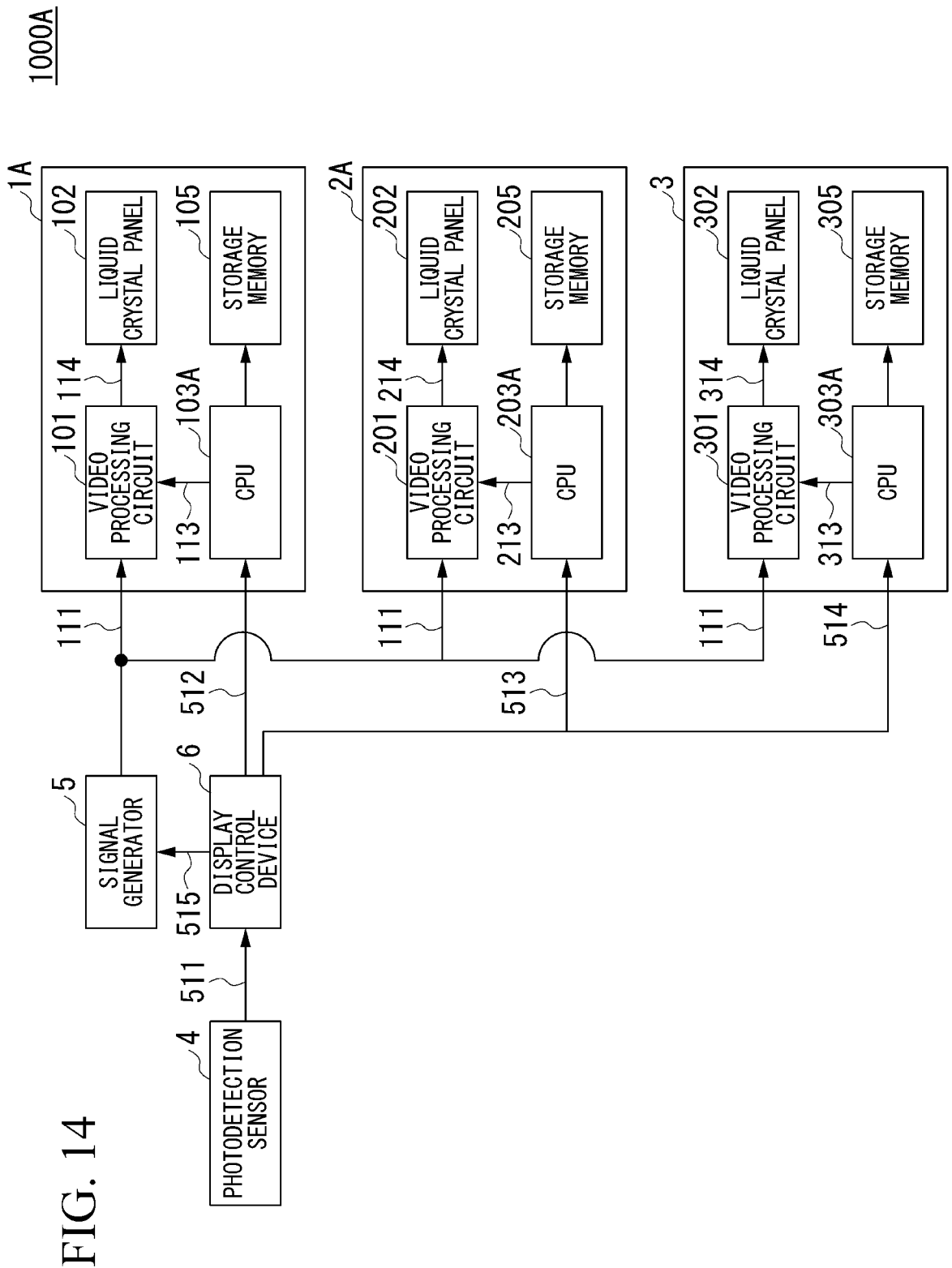
FIG. 14 is a block diagram schematically illustrating a configuration of a display system to which a display control device according to a second embodiment is applied.

FIG. 14 is a block diagram schematically illustrating a configuration of a display system to which a display control device according to a second embodiment is applied. A display system 1000A according to this embodiment includes a display control device 6 in addition to the configuration of the display system 1000 according to the first embodiment and includes a display device 1A, a display device 2A, and a display device 3A instead of the display device 1, the display device 2, and the display device 3. Here, the display device 1A, the display device 2A, and the display device 3A have functions shared with the display device 1, the display device 2, and the display device 3 according to the first embodiment. The shared functions will not be described and different functions will be described.

In the second embodiment, the photodetection sensor 4 is not connected to the display device 1A, but is connected to the display control device 6. The photodetection sensor 4 outputs a result of detection as a photodetection-sensor detection signal 511 to the display control device 6.

The display control device 6 is a device other than the display device 1A, the display device 2A, and the display device 3A constituting the display system 1000A and is, for example, a computer. The display control device 6 has a function of acquiring a photodetection-sensor detection signal 511 from the photodetection sensor 4. The display control device 6 controls a CPU 103A by outputting a video-display-device control signal 512 to the CPU 103A. The display control device 6 controls a CPU 203A by outputting a video-display-device control signal 513 to the CPU 203A. The display control device 6 controls a CPU 303A by outputting a video-display-device control signal 514 to the CPU 303A. The display control device 6 controls a signal generator 5 by outputting a signal-generator control signal 515 to the signal generator 5. For example, the display control device 6 can change a video signal 111 output from the signal generator 5 using the signal-generator control signal 515.

In the first embodiment, one of the display device 1, the display device 2, and the display device 3 serves as a master device and the other display devices serve as slave devices to perform display control. On the other hand, in the second embodiment, since display control is performed by the display control device 6, the display device 1A, the display device 2A, and the display device 3A may not have to be set as a master device or a slave device.

Figure 15:
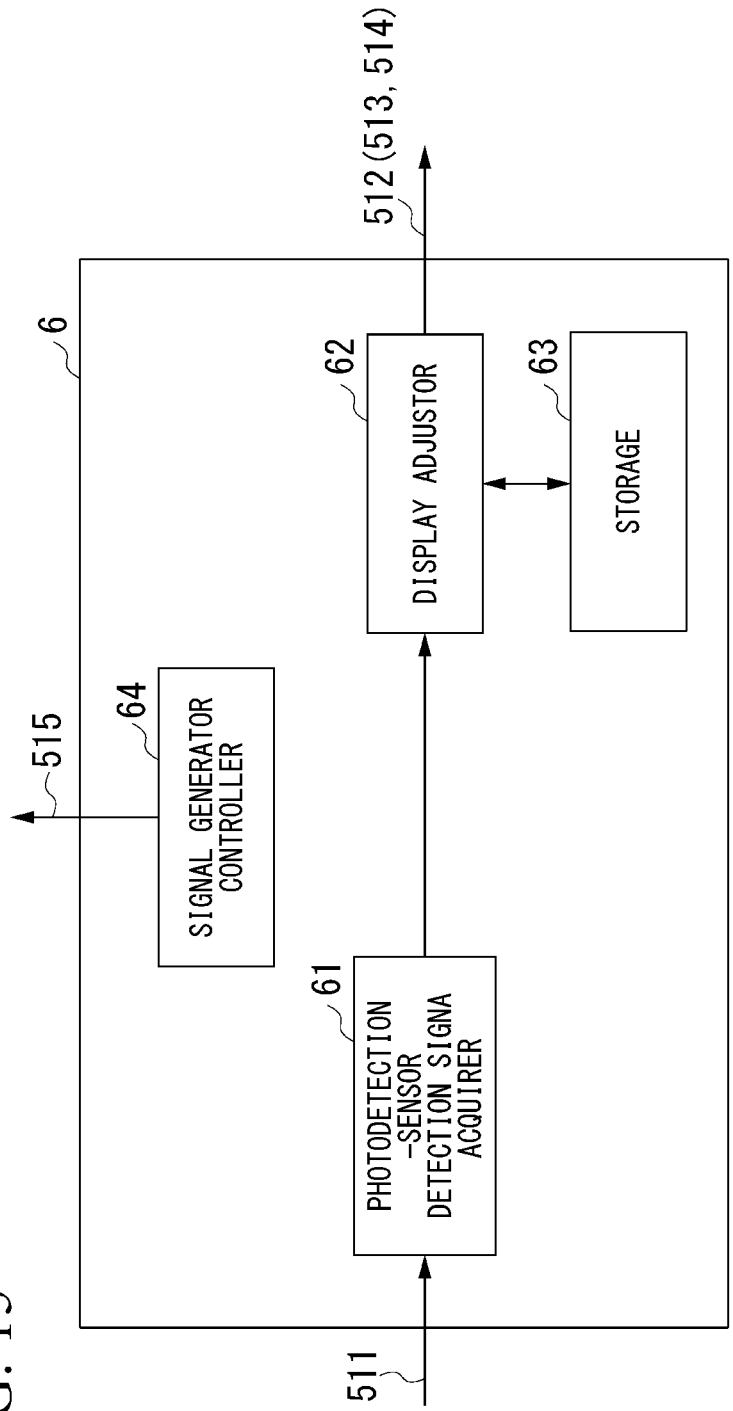
FIG. 15 is a block diagram schematically illustrating a functional configuration of a display control device according to the second embodiment.

FIG. 15 is a block diagram schematically illustrating a functional configuration of the display control device according to the second embodiment.

The display control device 6 have functions of a photodetection-sensor detection signal acquirer 61, a display adjustor 62, a storage 63, and a signal generator controller 64.

The photodetection-sensor detection signal acquirer 61 acquires the photodetection-sensor detection signal 511 from the photodetection sensor 4 and outputs the acquired photodetection-sensor detection signal 511 to the display adjustor 62.

The display adjustor 62 has the same function as the display adjustor 1031 in the first embodiment. That is, the display adjustor 62 determines a degree of enlargement or reduction of a video signal displayed on the display device 1A, the display device 2A, and the display device 3A on the basis of a difference between a pixel size of a first display device and a pixel size of a second display device of which the pixel size is different from that of the first display device based on a result of detection from the photodetection sensor 4. The display adjustor 62 determines target areas which are areas to be displayed on the display device 1A, the display device 2A, and the display device 3A out of the video signal and the degrees of enlargement or reduction of the video signal on the basis of a distance of a non-display area between the display screen of the first display device and the display screen of the second display device based on the result of detection from the photodetection sensor 4. For example, the display adjustor 62 detects a difference between the pixel size of the first display device and the pixel size of the second display device on the basis of a result of detection acquired from the photodetection sensor 4 by detecting a detection display image displayed on the display screen of the first display device, a result of detection acquired from the photodetection sensor 4 by detecting the detection display image displayed on the display screen of the second display device, and details of the detection display image. The detection display image is an image of which a display position on the display screen on which the image is displayed differs or an image in which images with different inspection pattern sizes which are sizes for displaying the detection display image on the display screen are sequentially displayed. The inspection pattern size is a size of an area for displaying a detection display pattern displayed in at least a part of a display area of a liquid crystal panel. More specifically, the display adjustor 62 detects the difference between the pixel size of the first display device and the pixel size of the second display device on the basis of the number of display pixels between the first photodetector and the second photodetector based on a distance between the first photodetector and the second photodetector and results of detection acquired from the first photodetector and the second photodetector by detecting the detection display image and the number of display pixels between the third photodetector and the fourth photodetector based on a distance between the third photodetector and the fourth photodetector and results of detection acquired from the third photodetector and the fourth photodetector by detecting the detection display image. The display adjustor 62 detects a distance of a non-display area between the display screen of the first display device and the display screen of the second display device on the basis of a distance between the first photodetector and the third photodetector, a distance from the first photodetector to an end of the display screen of the first display device based on the result of detection acquired from the first photodetector by detecting the detection display image, and a distance from the third photodetector to an end of the display screen of the second display device based on the result of detection acquired from the third photodetector by detecting the detection display image, and determines the target areas of the video signal which are areas to be displayed on the display screens of the display device 1A, the display device 2A, and the display device 3A out of the video signal and the degrees of enlargement or reduction of the video signal on the basis of the detected non-display area.

The display adjustor 62 outputs a video-display-device control signal 512 indicating the determined target areas of the video signal on the display device 1A, the display device 2A, and the display device 3A and the determined degrees of enlargement or reduction of the video signal to the CPU 103A of the display device 1A, outputs a video-display-device control signal 513 to the CPU 203A of the display device 2A, and outputs a video-display-device control signal 514 to the CPU 303A of the display device 3A.

The method of detecting the non-display area and the difference in pixel size between the display device 1A, the display device 2A, and the display device 3A on the basis of a result of detection from the photodetection sensor 4 is the same as in the first embodiment.

The storage 63 stores various types of data. For example, the storage 63 stores the positions of the photodetectors 40 of the photodetection sensor 4 and the difference in pixel size and the non-display area between the display device 1A, the display device 2A, and the display device 3A which are detected by the display adjustor 62.

The signal generator controller 64 controls the signal generator 5 by outputting the signal-generator control signal 515 to the signal generator 5.

Third Embodiment

A third embodiment will be described below.

Figure 16:
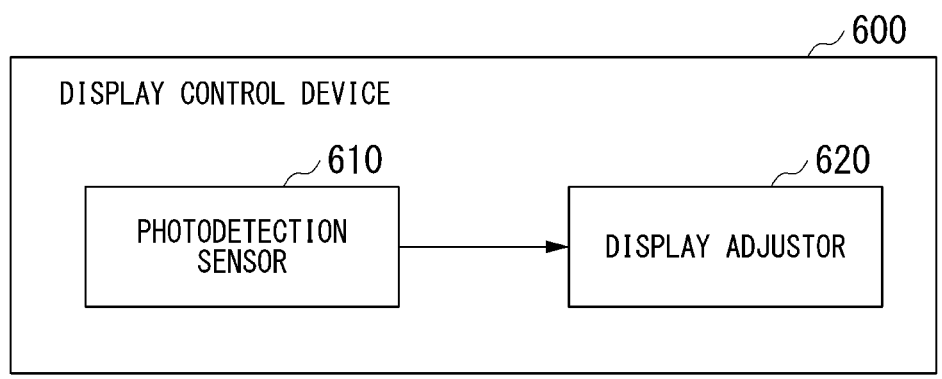
FIG. 16 is a block diagram schematically illustrating a configuration of a display control device according to a third embodiment.

FIG. 16 is a diagram illustrating a configuration of a display control device according to a third embodiment.

A display control device 600 includes a photodetection sensor 610 and a display adjustor 620.

The photodetection sensor 610 detects light from pixels of display screens using both a first display device and a second display device with a pixel size different from that of the first display device in a display system in which a video signal is displayed on a plurality of adjacent display devices as detection targets.

The display adjustor 620 determines a degree of enlargement or reduction of a video signal displayed on each display device on the basis of a difference between the pixel size of the first display device and the pixel size of the second display device based on a result of detection from the photodetection sensor.

The display control device 600 can be connected to, for example, a display device or another computer for use. Particularly, it can be used to control display of display devices in a multi-display system. Accordingly, since a video signal can be displayed on the display devices in consideration of a difference in pixel size between a plurality of display devices, it is possible to curb a decrease in continuity of an image indicated by a video signal which is displayed on display devices adjacent to each other and to display an image with maintained continuity close to an original image even when display devices with different pixel sizes are combined.

Detection of a position may be performed by recording a program for realizing the function of the CPU or the video processing circuit in the display device illustrated in FIG. 1 or the display control device illustrated in FIG. 14 on a computer-readable recording medium and causing a computer system to read and execute the program recorded on the recording medium. The "computer system" mentioned herein may include an operating system (OS) or hardware such as peripherals.

The "computer system" may also include a WWW system having a homepage provision environment (or a homepage provision display environment).

The "computer-readable recording medium" may be a portable medium such as a flexible disk, a magneto-optical disc, a ROM, or a CD-ROM or a storage device such as a hard disk incorporated in a computer system. The "computer-readable recording medium" may include a medium that holds a program for a predetermined time like a volatile memory in a computer system serving as a server or a client. The program may be a program for realizing some of the aforementioned functions or may be a program which can realize the aforementioned functions in combination with another program stored in advance in the computer system. The program may be stored in a predetermined server and the program may be delivered (downloaded) via a communication line in response to a request from another device.

While embodiments of the invention have been described above in detail with reference to the drawings, a specific configuration of the invention is not limited to the embodiments and includes a design without departing from the gist of the invention.

REFERENCE SIGNS LIST 1000, 1000A Display system
1, 2, 3, 1A, 2A, 3A Display device
101, 201, 301 Video processing circuit
102, 202, 302 Liquid crystal panel
103, 203, 303, 103A, 203A, 303A Central processing unit (CPU)
1031 Display adjustor
1032 Display controller
105, 205, 305 Storage memory
106, 206, 306 Frame portion
111 Video signal
112 Inter-video-display-device control signal
113, 213, 313 Video-processing-circuit control signal
114, 214, 314 Liquid-crystal-panel video signal
115, 511 Photodetection-sensor detection signal
4 Photodetection sensor
40A First photodetector
40B Second photodetector
40C Third photodetector
40D Fourth photodetector
400 Background
410 Detection display pattern
500 Non-display area
5 Signal generator
6 Display control device
61 Photodetection-sensor detection signal acquirer
62 Display adjustor
63 Storage
64 Signal generator controller
512, 513, 514 Video-display-device control signal
515 Signal-generator control signal
600 Display control device
610 Photodetection sensor
620 Display adjustor

The invention claimed is:
1. A display control device comprising:
a photodetection sensor configured to detect light from pixels of display screens with both a first display device and a second display device with a pixel size different from that of the first display device in a display system in which a video signal is displayed on a plurality of display devices adjacent to each other as detection targets; and
a display adjustor configured to determine a degree of enlargement or reduction of video signals displayed on the display devices on the basis of a difference between the pixel size of the first display device and the pixel size of the second display device based on a result of detection from the photodetection sensor,
wherein the display adjustor is configured to search for a detection area of the photodetection sensor on each display screen by moving a detection display image for allowing the photodetection sensor to detect light when the detection display image is displayed in the detection area of the photodetection sensor along an edge of the display screen.

2. The display control device according to claim 1, wherein the display adjustor is configured to determine a target area of an image indicated by the video signals and displayed on each display device and the degree of enlargement or reduction on the basis of a distance of a non-display area between the display screen of the first display device and the display screen of the second display device based on the result of detection from the photodetection sensor and relative positions of the display devices in the display system.

3. The display control device according to claim 1, wherein the display adjustor is configured to detect the difference between the pixel size of the first display device and the pixel size of the second display device on the basis of a result of detection acquired from the photodetection sensor by detecting a detection display image displayed on the display screen of the first display device, a result of detection acquired from the photodetection sensor by detecting the detection display image displayed on the display screen of the second display device, and details of the detection display image.

4. The display control device according to claim 3, wherein the photodetection sensor includes a first photodetector and a second photodetector of which the first display device comprises a detection target and a third photodetector and a fourth photodetector of which the second display device comprises a detection target, and
wherein the display adjustor is configured to detect a difference between the pixel size of the first display device and the pixel size of the second display device on the basis of the number of display pixels between the first photodetector and the second photodetector based on a distance between the first photodetector and the second photodetector and results of detection acquired from the first photodetector and the second photodetector by detecting the detection display image and the number of display pixels between the third photodetector and the fourth photodetector based on a distance between the third photodetector and the fourth photodetector and results of detection acquired from the third photodetector and the fourth photodetector by detecting the detection display image.

5. The display control device according to claim 4, wherein detection targets of the first photodetector and the third photodetector comprise positions facing each other with a non-display area between the display screen of the first display device and the display screen of the second display device interposed therebetween, and
wherein the display adjustor is configured to detect a distance of the non-display area between the display screen of the first display device and the display screen of the second display device on the basis of a distance between the first photodetector and the third photodetector, a distance from the first photodetector to an end of the display screen of the first display device based on a result of detection acquired from the first photodetector by detecting the detection display image, and a distance from the third photodetector to an end of the display screen of the second display device based on a result of detection acquired from the third photodetector by detecting the detection display image and to determine the target area and the degree of enlargement or reduction of the video signal displayed on each display device on the basis of the detected non-display area.

6. The display control device according to claim 3, wherein the detection display image comprises an image of which a display position on the display screen on which the image is displayed differs or an image in which images with different sizes are sequentially displayed on the display screen.

7. The display control device according to claim 1, wherein the display adjustor is configured to search for a detection area of the photodetection sensor on each display screen by dividing the display screen and displaying a detection display image for allowing the photodetection sensor to detect light when the detection display image is displayed in the detection area of the photodetection sensor in the divided areas.

8. A display device that is provided in a display system, the display device comprising the display control device according to claim 1.

9. A display control device comprising:
a photodetection sensor configured to detect light from pixels of display screens with both a first display device and a second display device with a pixel size different from that of the first display device in a display system in which a video signal is displayed on a plurality of display devices adjacent to each other as detection targets; and
a display adjustor configured to determine a degree of enlargement or reduction of video signals displayed on the display devices on the basis of a difference between the pixel size of the first display device and the pixel size of the second display device based on a result of detection from the photodetection sensor,
wherein the display adjustor is configured to search for a detection area of the photodetection sensor on each display screen by displaying a detection display image for allowing the photodetection sensor to detect light when the detection display image is displayed in the detection area of the photodetection sensor along an entire side of the display screen and moving a reduced detection display image along the side from which the photodetection sensor has detected light.

10. The display control device according to claim 9, wherein the display adjustor is configured to determine a target area of an image indicated by the video signals and displayed on each display device and the degree of enlargement or reduction on the basis of a distance of a non-display area between the display screen of the first display device and the display screen of the second display device based on the result of detection from the photodetection sensor and relative positions of the display devices in the display system.

11. The display control device according to claim 9, wherein the display adjustor is configured to search for a detection area of the photodetection sensor on each display screen by dividing the display screen and displaying a detection display image for allowing the photodetection sensor to detect light when the detection display image is displayed in the detection area of the photodetection sensor in the divided areas.

12. A display device that is provided in a display system, the display device comprising the display control device according to claim 9.

13. A display control method comprising:
detecting light from pixels of display screens with both a first display device and a second display device with a pixel size different from that of the first display device in a display system in which a video signal is displayed on a plurality of display devices adjacent to each other as detection targets; and determining a degree of enlargement or reduction of video signals displayed on the display devices on the basis of a difference between the pixel size of the first display device and the pixel size of the second display device based on a result of detection from the photodetection sensor, wherein the determining the degree of enlargement or reduction comprises searching for a detection area of the photodetection sensor on each display screen by moving a detection display image for allowing the photodetection sensor to detect light when the detection display image is displayed in the detection area of the photodetection sensor along an edge of the display screen.

* * * * *